United States Patent
Takagi et al.

(10) Patent No.: US 11,088,489 B2
(45) Date of Patent: Aug. 10, 2021

(54) SHIELDED CONNECTOR HAVING A MECHANISM FOR PREVENTING WATER INVASION

(71) Applicant: Yazaki Corporation, Tokyo (JP)

(72) Inventors: Akiyoshi Takagi, Shizuoka (JP); Hikaru Oi, Shizuoka (JP); Tomoharu Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 23 days.

(21) Appl. No.: 16/836,993

(22) Filed: Apr. 1, 2020

(65) Prior Publication Data

US 2020/0321723 A1 Oct. 8, 2020

(30) Foreign Application Priority Data

Apr. 4, 2019 (JP) .............................. JP2019-071800

(51) Int. Cl.

| H01R 13/46 | (2006.01) |
|---|---|
| H01R 13/52 | (2006.01) |
| H02G 15/013 | (2006.01) |
| H01R 13/502 | (2006.01) |
| H02G 15/04 | (2006.01) |
| H01R 13/6581 | (2011.01) |

(52) U.S. Cl.
CPC ....... *H01R 13/5205* (2013.01); *H01R 13/502* (2013.01); *H01R 13/6581* (2013.01); *H02G 15/013* (2013.01); *H02G 15/04* (2013.01)

(58) Field of Classification Search
CPC .. H01R 13/5205; H01R 13/514; H01R 13/46; H01R 13/502; H01R 13/6581; H02G 15/013; H02G 15/04

USPC ......................................................... 439/587
See application file for complete search history.

(56) References Cited

U.S. PATENT DOCUMENTS

| 7,766,675 | B2* | 8/2010 | Suzuki | H01R 9/0527 |
| | | | | 439/98 |
| 8,562,381 | B2* | 10/2013 | Kawamura | H01R 4/34 |
| | | | | 439/801 |
| 8,992,249 | B2* | 3/2015 | Kobayashi | H01R 13/6591 |
| | | | | 439/548 |
| 9,083,107 | B2* | 7/2015 | Suzuki | H01R 13/5202 |
| 9,318,849 | B2* | 4/2016 | Kobayashi | H01R 13/5216 |

(Continued)

FOREIGN PATENT DOCUMENTS

JP 2015-103500 A 6/2015

*Primary Examiner* — Harshad C Patel
(74) *Attorney, Agent, or Firm* — Kenealy Vaidya LLP

(57) ABSTRACT

A connector includes: a terminal connected to an end terminal of an electrical wire, the terminal being inserted into an insertion hole of a housing of a device, the terminal being connected to a counterpart terminal of the counterpart device; an inner housing housing the terminal and the electrical wire; a shield shell having a sleeve body that houses the inner housing in the sleeve body and is inserted into the insertion hole, and an outer housing covering a rear side of the sleeve body in an advancing direction from an outside at the time of inserting the sleeve body into the insertion hole, wherein the outer housing has a fixing portion that fixes the outer housing to the housing, and the sleeve body has an electric contact that is brought into contact with an inner peripheral wall of the insertion hole.

18 Claims, 30 Drawing Sheets

(56) References Cited

U.S. PATENT DOCUMENTS

| | | | |
|---|---|---|---|
| 2002/0048994 A1* | 4/2002 | Oota | H01R 13/5205 |
| | | | 439/98 |
| 2004/0057187 A1* | 3/2004 | Kuboshima | H01R 13/5845 |
| | | | 361/118 |
| 2011/0235977 A1* | 9/2011 | Yamada | G02B 6/383 |
| | | | 385/76 |
| 2012/0021632 A1* | 1/2012 | Matsumoto | H01R 13/506 |
| | | | 439/271 |
| 2014/0045377 A1* | 2/2014 | Okamoto | H01R 13/6593 |
| | | | 439/607.41 |
| 2015/0050826 A1* | 2/2015 | Tashiro | H01R 13/5202 |
| | | | 439/278 |
| 2015/0144396 A1 | 5/2015 | Tanaka | |
| 2016/0172784 A1* | 6/2016 | Kataoka | H01R 13/6592 |
| | | | 439/271 |
| 2021/0066849 A1* | 3/2021 | Takagi | H01R 13/5202 |

* cited by examiner

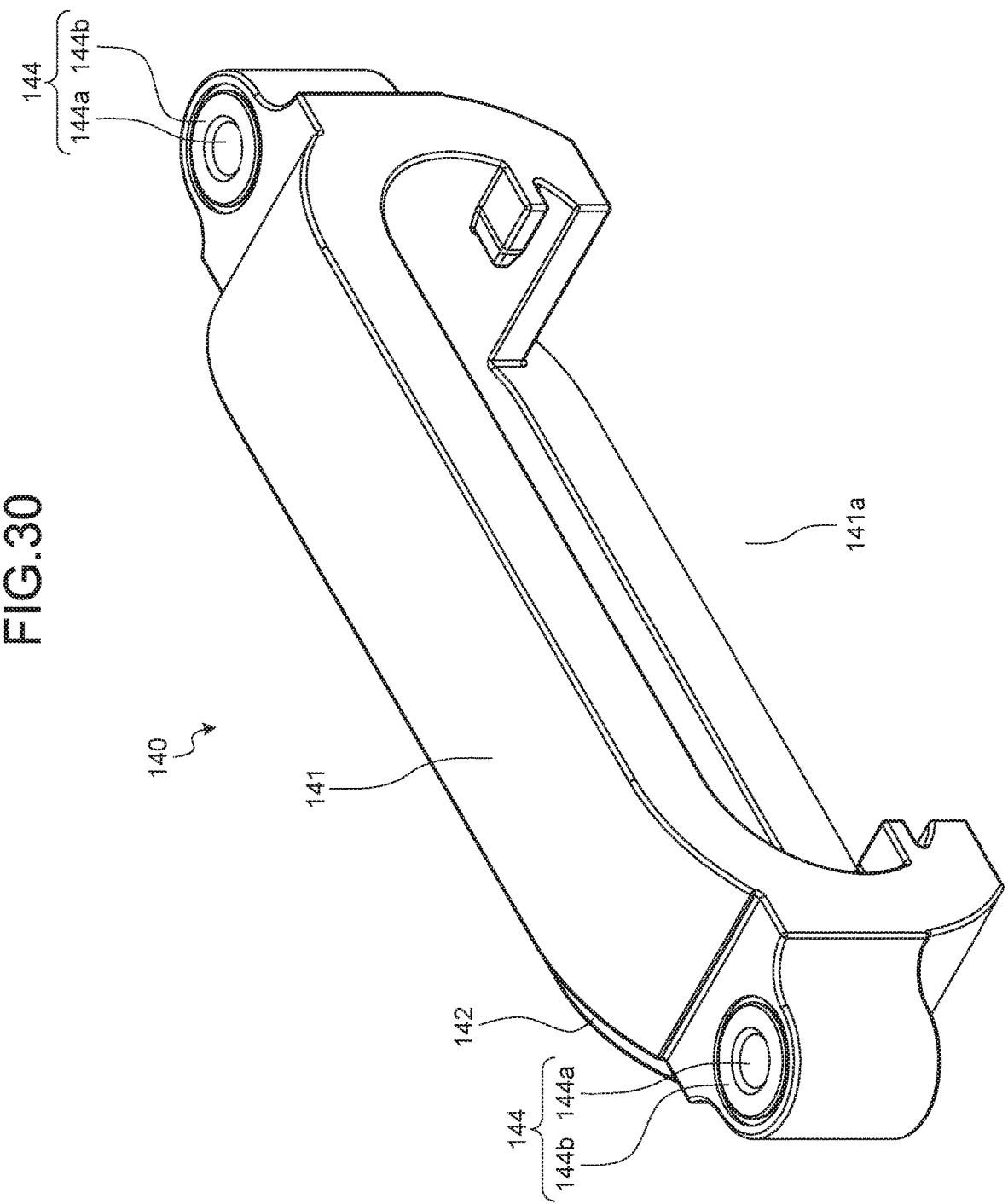

SHIELDED CONNECTOR HAVING A MECHANISM FOR PREVENTING WATER INVASION

CROSS-REFERENCE TO RELATED APPLICATION(S)

The present application claims priority to and incorporates by reference the entire contents of Japanese Patent Application No. 2019-071800 filed in Japan on Apr. 4, 2019.

BACKGROUND OF THE INVENTION

1. Field of the Invention

The present invention relates to a connector.

2. Description of the Related Art

Conventionally, there has been known a connector which is surrounded from the outside by a shield shell made of a conductive metal material so as to suppress invasion of noise into the inside of the connector. Such a connector is configured such that the connector makes its own terminal connected to a counterpart terminal of a counterpart device physically and electrically and, thereafter, a shield shell is fixed to a housing of the counterpart device using fixing jigs such as bolts to maintain a connection state. This type of connector is disclosed, for example, in Japanese Patent Application Laid-open No. 2015-103500.

By the way, the housing of the counterpart device is also formed using a conductive metal material so as to suppress the invasion of noise into the inside of the counterpart device. It is not always the case where the housing and the shield shell are respectively formed of metal materials having the same ionization tendency or substantially the same ionization tendency. In general, with respect to metals which are brought into contact with each other, when the ionization tendencies of the respective metal materials differ from each other, as a potential difference generated by a difference in ionization tendency is larger, a possibility that durability is lowered becomes larger depending on an environment where the metal materials are used. Accordingly, the conventional connector still has a room in improving durability of the connector itself and durability of a counterpart device.

SUMMARY OF THE INVENTION

In view of the above circumstances, it is an object of the present invention to provide a connector which can improve durability of the connector.

In order to achieve the above mentioned object, a connector according to one aspect of the present invention includes a terminal physically and electrically connected to an end terminal of an electrical wire, the terminal being inserted into an insertion hole of a housing made of metal of a counterpart device, the terminal being physically and electrically connected to a counterpart terminal of the counterpart device; an inner housing formed of an insulating resin material, the inner housing housing the terminal and the electrical wire, the inner housing allowing the electrical wire to be pulled out to an outside from the inner housing; a shield shell formed of a metal material, the shield shell having a sleeve body that houses the inner housing in the sleeve body and is inserted into the insertion hole, and an outer housing formed of an insulating resin material, the outer housing covering a rear side of the sleeve body in an advancing direction from an outside at the time of inserting the sleeve body into the insertion hole, wherein the outer housing has a fixing portion that fixes the outer housing to the housing, and the sleeve body has an electric contact that is brought into contact with an inner peripheral wall of the insertion hole.

According to another aspect of the present invention, in the connector, it is possible to further include that a first liquid invasion preventing member having an annular shape and configured to close an annular gap between an outer peripheral wall of the inner housing and an inner peripheral wall of the sleeve body; and a second liquid invasion preventing member having an annular shape and configured to close an annular gap between an outer peripheral wall of the sleeve body and the inner peripheral wall of the insertion hole of the housing, wherein the electric contact is disposed in front of the first liquid invasion preventing member and the second liquid invasion preventing member in the advancing direction.

According to still another aspect of the present invention, in the connector, it is possible to configure that the outer housing has a fitting portion having an annular shape that is disposed behind the second liquid invasion preventing member in the advancing direction and is fitted in the insertion hole.

According to still another aspect of the present invention, in the connector, it is possible to configure that the electric contact is an elastic contact configured to apply a reaction force generated by elastic deformation to the inner peripheral wall of the insertion hole from a sleeve body side.

According to still another aspect of the present invention, in the connector, it is possible to configure that the electric contact is an elastic contact part formed as a part separate from the sleeve body using a material having conductivity and elasticity, and configured to apply a reaction force generated by elastic deformation to the sleeve body and an inner peripheral wall of the insertion hole.

According to still another aspect of the present invention, in the connector, it is possible to configure that the shield shell includes an inner shell that forms the sleeve body, and an outer shell that is disposed behind the outer housing in the advancing direction and is physically and electrically connected to the inner shell.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 30 is a perspective view of the outer housing according to the modification as viewed from a different angle.

DETAILED DESCRIPTION OF THE PREFERRED EMBODIMENTS

Figure 1:
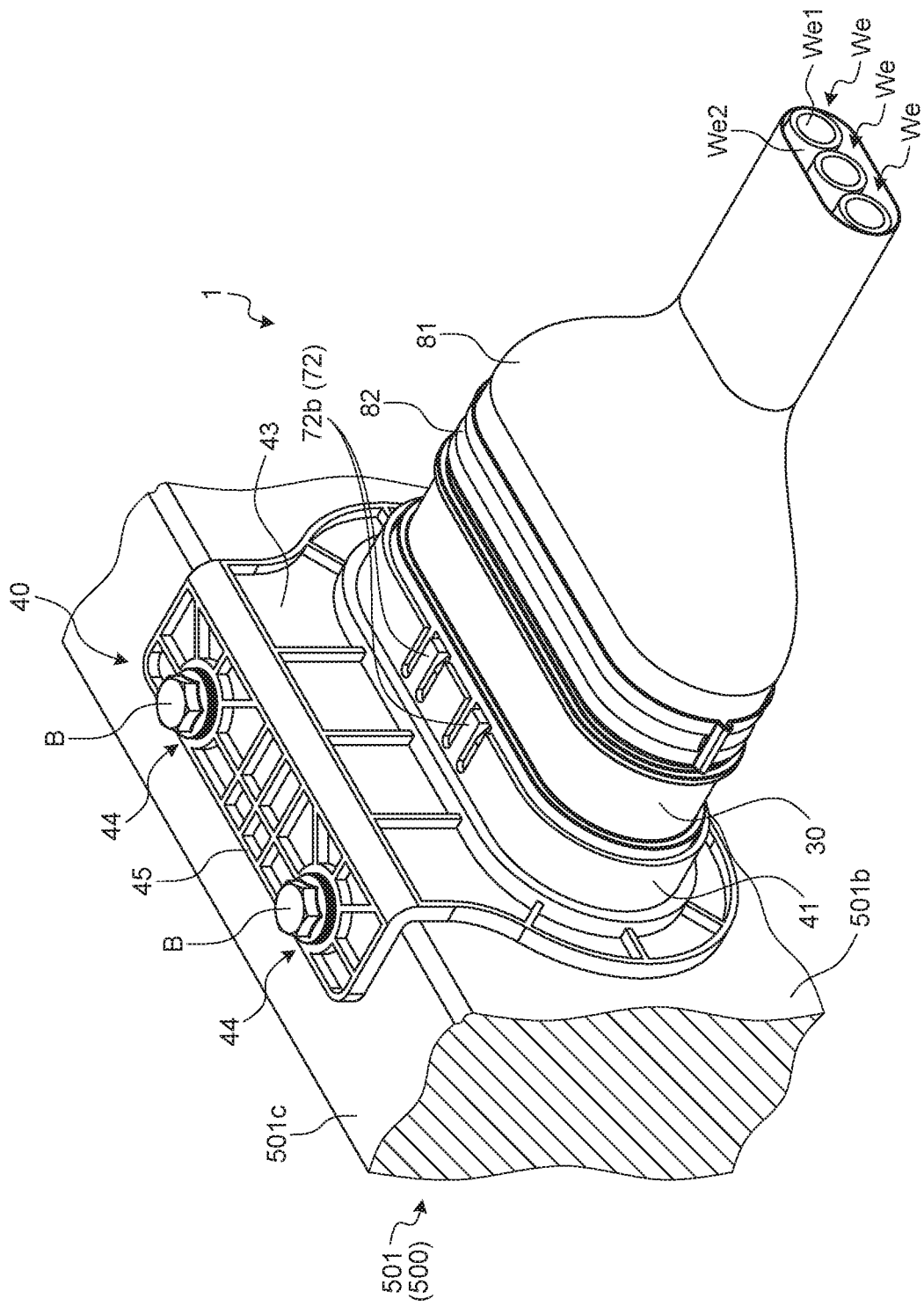
FIG. 1 is a perspective view illustrating a connector of an embodiment mounted on a counterpart device.

Hereinafter, a connector according an embodiment of the present invention will be described in detail with reference to the drawings. The present invention is not limited by the embodiment.

Embodiment

The connector according to one embodiment of the Present invention will be described with reference to FIGS. 1 to 14.

In FIGS. 1 to 7, reference numeral 1 indicates a connector according to this embodiment. An electrical connection is established between a counterpart device 500 and a device (not illustrated in the drawing) disposed on distal end sides of electrical wires We by electrically connecting the connector 1 to counterpart terminals (not illustrated in the drawing) of the counterpart device 500 (FIGS. 1 to 4). The connector 1 includes terminals 10, an inner housing 20, a shield shell 30, and an outer housing 40 (FIGS. 3, 4, 6, and 7).

The terminal 10 is formed using a metal material. For example, the terminals 10 are formed into a predetermined shape by press forming such as bending or cutting of a metal plate which forms a base material. The terminals 10 are physically and electrically connected to an end terminal of the electrical wire We. An electrical connection is established between the counterpart device 500 and an equipment disposed on a distal end of the electrical wire We by inserting the terminals 10 into insertion holes 501a (FIGS. 3 to 5) formed in the metal-made housing 501 of the counterpart device 500 and by physically and electrically connecting the terminals 10 to counterpart terminals of the counterpart device 500. Accordingly, the terminals 10 have terminal connecting portions 11 which are physically and electrically connected to the counterpart terminals, and electrical wire connecting portions 12 which physically and electrically connect the terminal connecting portions 11 to the end terminal of the electrical wire We (FIG. 4).

Figure 2:
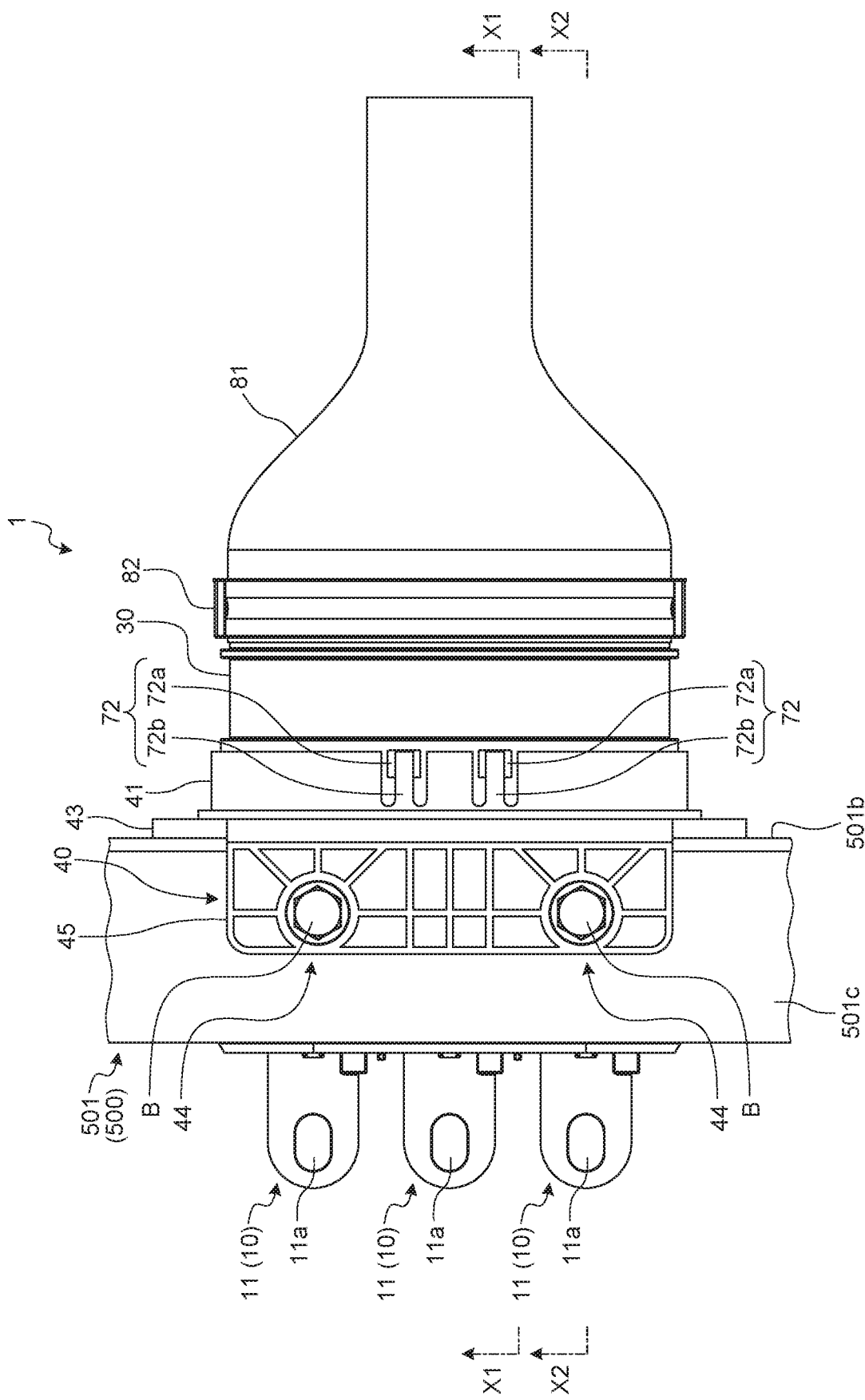
FIG. 2 is a plan view illustrating the connector of the embodiment mounted on the counterpart device.
Figure 4:
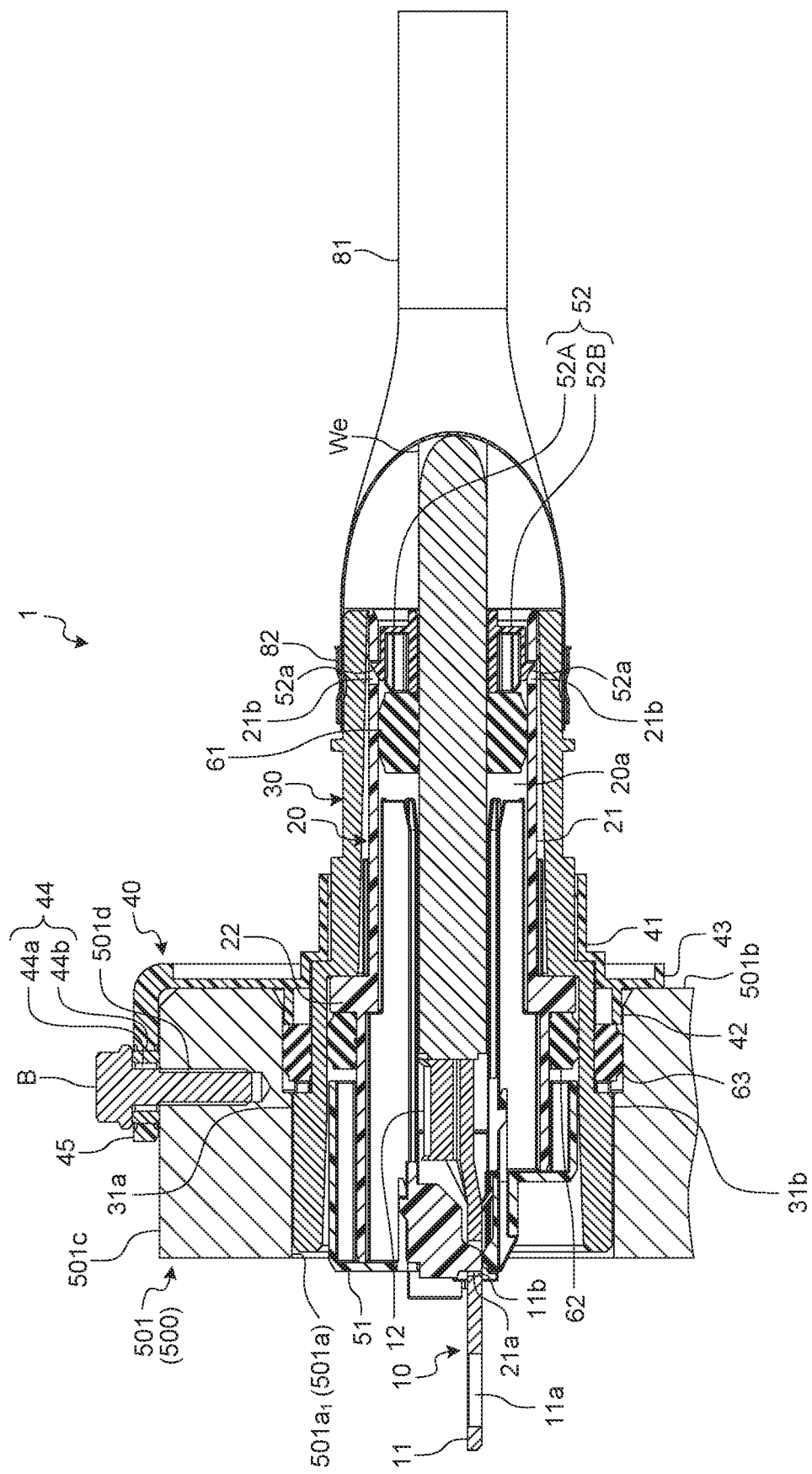
FIG. 4 is a cross-sectional view taken along line X2-X2 in FIG. 2.
Figure 6:
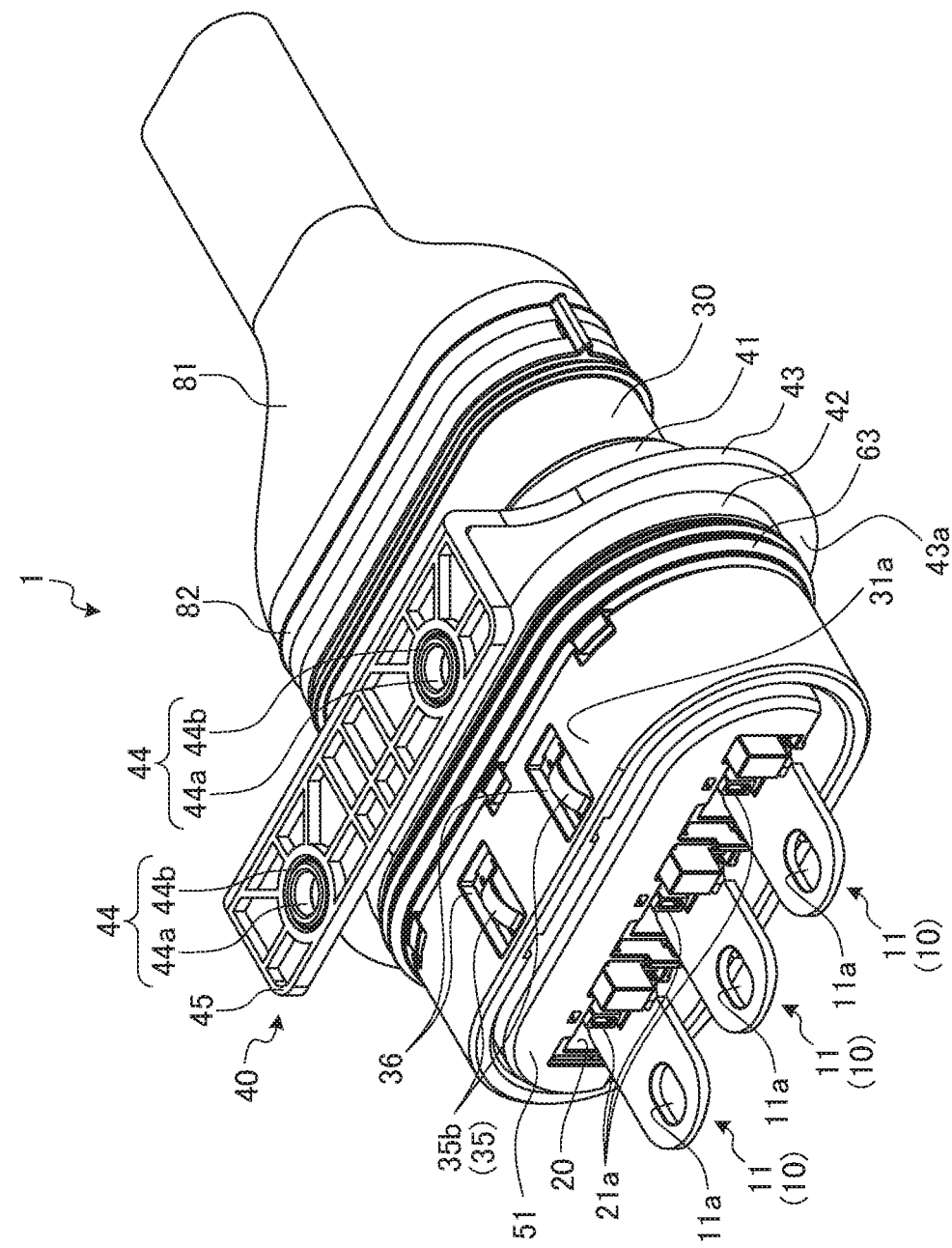
FIG. 6 is a perspective view of the connector of the embodiment as viewed from a terminal side.

In the exemplified example, the terminal connecting portions 11 are formed in a cantilever manner, and a through hole 11a is formed in each terminal connecting portion 11 (FIGS. 2, 4, and 6). In the exemplified example, the terminal connecting portions 11 are physically and electrically connected to the counterpart terminals by being fixed to the counterpart terminals by bolts, for example. A connection mode between the terminals 10 and the counterpart terminals may not be always restricted to such a fixing structure using bolts. For example, the terminal 10 and the counterpart terminal are formed in shapes which allow fitting engagement between the terminal 10 and the counterpart terminal. That is, one of the terminal 10 and the counterpart terminal may be formed into a female terminal shape and the other of the terminal 10 and the counterpart terminals may be formed into a male terminal shape.

The electrical wire connecting portion 12 is physically and electrically connected to the electrical wire We by connecting the electrical wire connecting portion 12 to core wires We1 (FIGS. 1 and 5) disposed at the end terminal of the electrical wire We by pressure bonding or welding, for example. In the exemplified example, the electrical wire connecting portion 12 is pressure-bonded to the core wires We1 by connecting two barrel members to the bare core wires We1 caulking.

In the exemplified example, the terminal 10 is formed in a straight shape where the terminal connecting portion 11 and the electrical wire connecting portion 12 are arranged on a straight line. Accordingly, the electrical wire We is pulled out from the electrical wire connecting portion 12 along an extending direction of the terminal 10 along the straight line.

In the exemplified example, the connector 1 includes three sets of combinations of the terminal 10 and the electrical wire We where the terminal 10 and the electrical wire We form a pair.

The inner housing 20 is formed using of an insulating resin material (an insulating synthetic resin material or the like), for example. The terminal 10 and the electrical wire We are housed in the inner housing 20. The terminal 10 is held by the inner housing 20, and the electrical wire We is pulled out to the outside from the inner housing 20.

Figure 8:
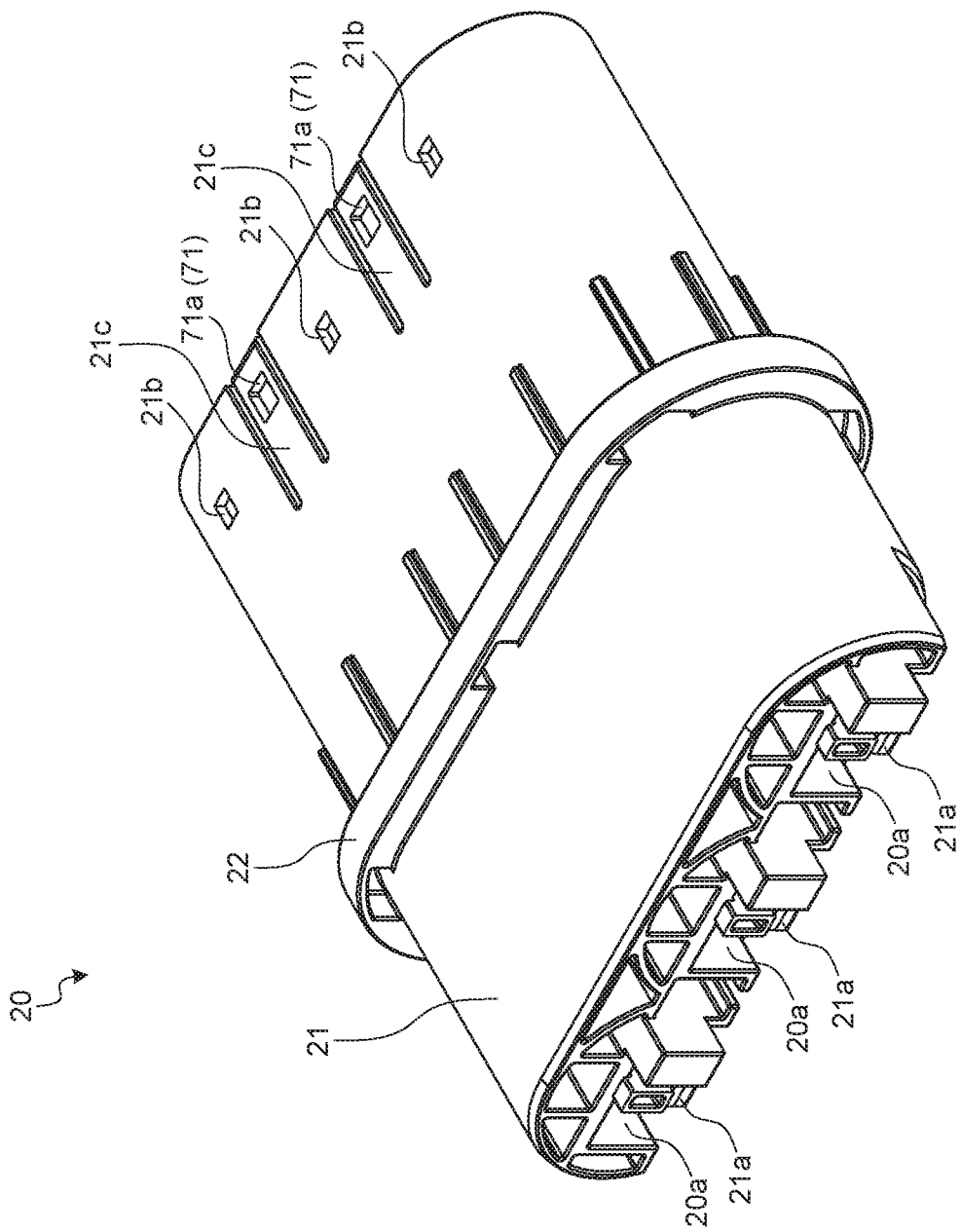
FIG. 8 is a perspective view illustrating an inner housing.

A housing chamber 20a in which the terminal 10 and the electrical wire We are housed is formed in the inner housing 20 (FIGS. 4 and 8). The electrical wire connecting portion 12 of the terminal 10 and the end terminal of the electrical wire We are housed in the housing chamber 20a. The housing chamber 20a has openings at both ends with a chamber room sandwiched between both ends. The terminal 10 is housed in the housing chamber 20a in state where an extending direction of the terminals 10 is aligned with a direction that both ends of the housing chamber 20a are arranged in an opposedly facing manner. In the inner housing 20, the terminal connecting portion 11 of the terminal 10 protrudes toward the outside of the housing chamber 20a from the opening at one end of the housing chamber 20a, and the electrical wire We is pulled out to the outside of the housing chamber 20a from the opening at the other end of the housing chamber 20a in a direction opposite to the protruding direction of the terminal connecting portion 11. In such a configuration, the opening at the other end of the housing chamber 20a forms a electrical wire pull-out opening. In the inner housing 20, the housing chamber 20a is formed for each combination of the terminal 10 and the electrical wire We which form a pair.

Figure 3:
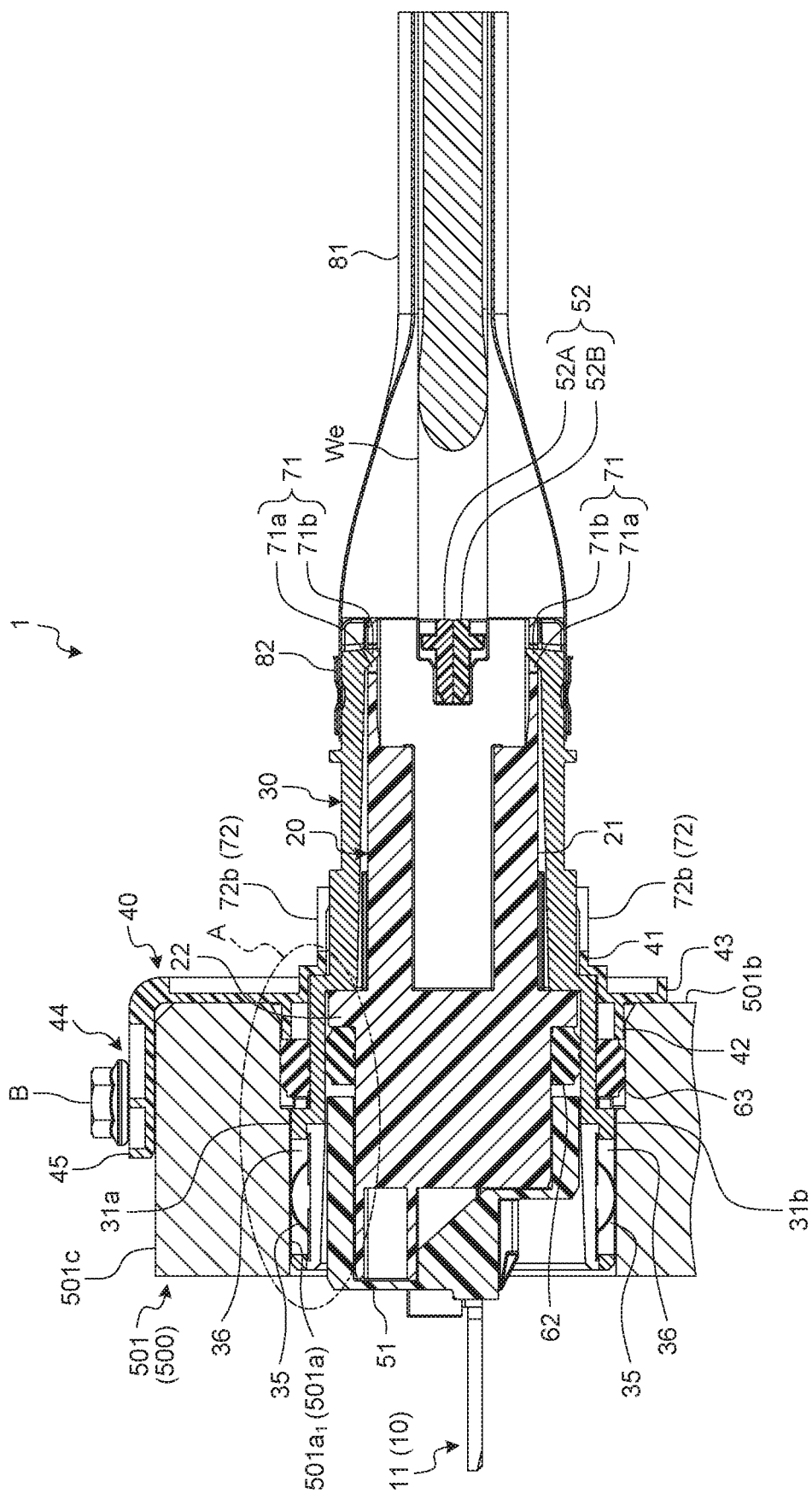
FIG. 3 is a cross-sectional view taken along line X1-X1 in FIG. 2.

In the exemplified example, the inner housing 20 has a sleeve portion 21 formed in an oblong sleeve shape or an angular sleeve shape (FIGS. 3, 4, and 8). In the exemplified example, the sleeve portion 21 is formed in an oblong sleeve shape. In the inner housing 20, the respective housing chambers 20a are formed in the sleeve portion 21 from one end to the other end. In the inner housing 20, openings disposed at one ends of the housing chambers 20a is formed at one end of the sleeve portion 21, and the openings at the other ends of the housing chambers 20a are formed at the other end of the sleeve portion 21. In the sleeve portion 21, the respective housing chambers 20a are arranged in a row along a direction orthogonal to a sleeve axis direction of the sleeve portion 21. With such a configuration, in the inner housing 20, the respective terminal connecting portions 11 protrude from one end of the sleeve portion 21, and the respective electrical wires We are pulled out from the other end of the sleeve portion 21.

Pawl portions 21a are formed on one end side of the housing chamber 20a of the sleeve portion 21 (FIGS. 4, 6, and 8). When the terminal 10 is housed in the housing chamber 20a, the pawl portion 21a of the housing chamber 20a is inserted into a through hole 11b formed in the terminal connecting portion 11 and hence, the terminal 10 is held in the inner housing 20 (FIG. 4).

In the exemplified example, the inner housing 20 has an annular flange portion 22 which protrudes from an outer peripheral wall of the sleeve portion 21 and conforms with a circumferential direction of the outer peripheral wall (FIGS. 3, 4, and 8). The flange portion 22 is mounted on a middle portion of an outer peripheral wall of the sleeve portion 21 in a sleeve axis direction.

In the inner housing 20, using the flange portion 22 of the inner housing 20 as a boundary, one end side of the sleeve portion 21 in the sleeve axis direction is inserted into an insertion hole 501a formed in the housing 501. The connector 1 according to this embodiment includes a front holder 51 which maintains a holding state of the respective terminals 10 with respect to the inner housing 20 by being assembled to one end side of the sleeve portion 21 (FIGS. 3 4, 6, and 7). The front holder 51 covers one end side of the sleeve portion 21 from the outside, and allows the respective terminal connecting portions 11 to protrude from the front holder 51. Although not illustrated in the drawing, the front holder 51 is held by the inner housing 20 due to a holding structure formed of pawl portions, hole portions, and the like. The front holder 51 is formed using, for example, an insulating resin material (insulating synthetic resin material or the like).

Figure 7:
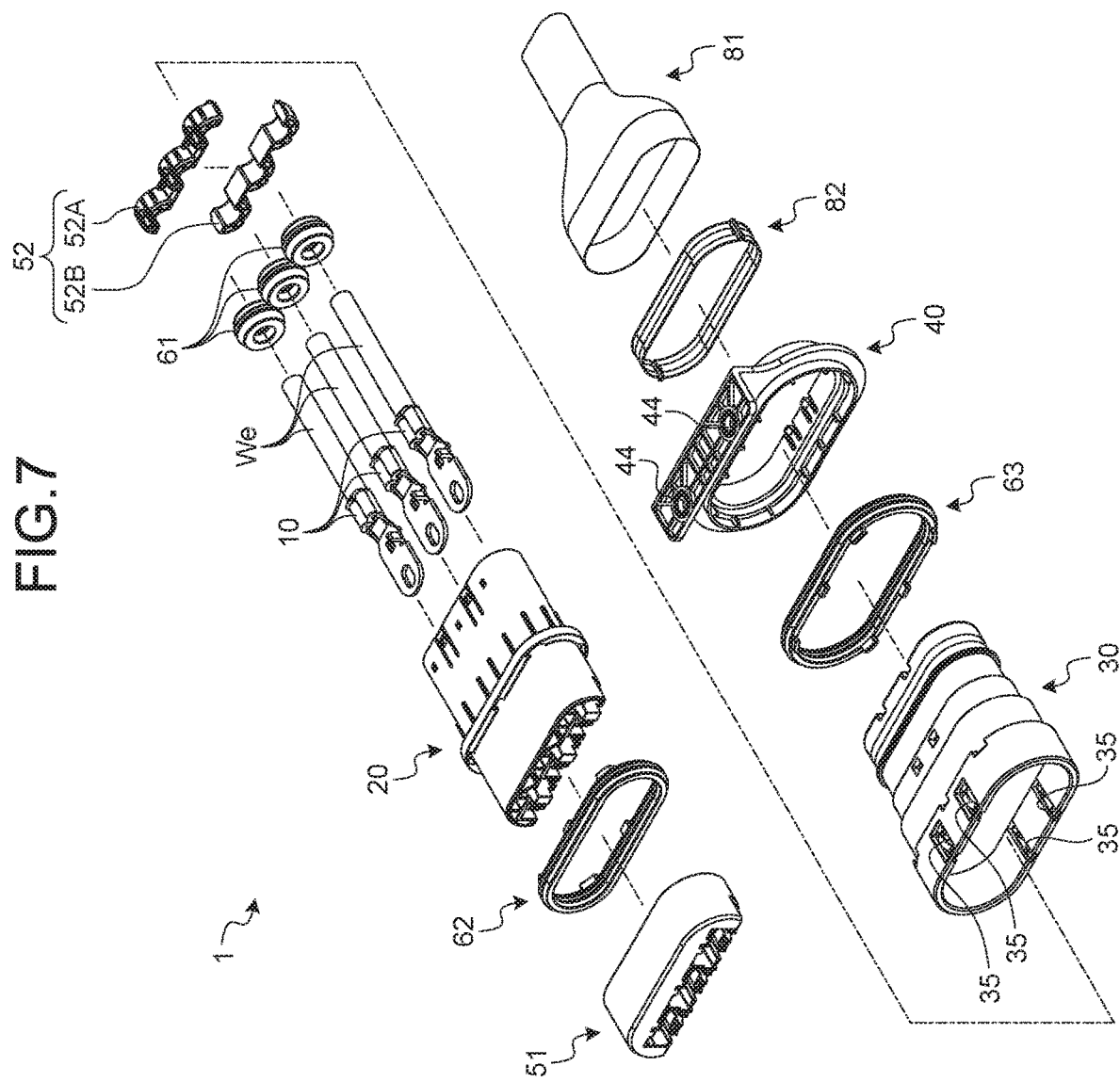
FIG. 7 is an exploded perspective view illustrating the connector of the embodiment.

In the inner housing 20, using the flange portion 22 as the boundary, electrical wire pull-out openings of the respective housing chambers 20a are disposed at the other end side of the sleeve portion 21 in the sleeve axis direction. In this embodiment, the respective electrical wire pull-out openings communicate with each other. In this embodiment, the connector 1 includes a rear holder 52 which is fitted into the respective electrical wire pull-out openings in a communicable state and holds the respective electrical wires We (FIGS. 3, 4, and 7). In the exemplified example, the rear holder 52 adopts a two-split structure formed of a first holder member 52A and a second holder member 52B, and the first holder member 52A and the second holder member 52B hold the respective electrical wires We in a sandwiched manner. The respective electrical wires We are pulled out to the outside through the rear holder 52. The rear holder 52 is held by the inner housing 20 in a state where pawl portions 52a formed on the first holder member 52A and the second holder member 52B respectively are inserted into through holes 21b formed in the sleeve portion 21 (FIG. 4). The first holder member 52A and the second holder member 52B are formed using an insulating resin material (insulating synthetic resin material or the like), for example.

In the inner housing 20, a rubber plug 61 is disposed in the housing chambers 20a more inside than the rear holder 52 (FIGS. 4 and 7). The rubber plug 61 is a liquid invasion preventing member which suppresses the inflow of a liquid such as water from the electrical wire pull-out opening to a terminal 10 side. The rubber plug 61 is formed in an annular shape, and is provided for each electrical wire We, and the rubber plugs 61 are housed in the housing chamber 20a together with the electrical wires We. An inner peripheral wall side of the rubber plug 61 is brought into close contact with a coating We2 (FIGS. 1 and 5) of the electrical wire We, and the outer peripheral wall side of the rubber plug 61 is brought into contact with an inner peripheral wall of the housing chamber 20a and hence, an annular gap between the electrical wire We and the housing chamber 20a is embedded by the rubber plug 61. In the exemplified example, the rubber plug 61 is sandwiched between the inner housing 20 and the rear holder 52 in the sleeve axis direction of the rubber plug 61.

The shield shell 30 is formed using a metal material (for example, stainless steel) for suppressing the invasion of noise from the outside. The inner housing 20 is housed in the shield shell 30, and a sleeve body which is inserted into the insertion hole 501a of the housing 501 is disposed in the shield shell 30. In the connector 1, the sleeve body itself is used as the shield shell 30.

Figure 9:
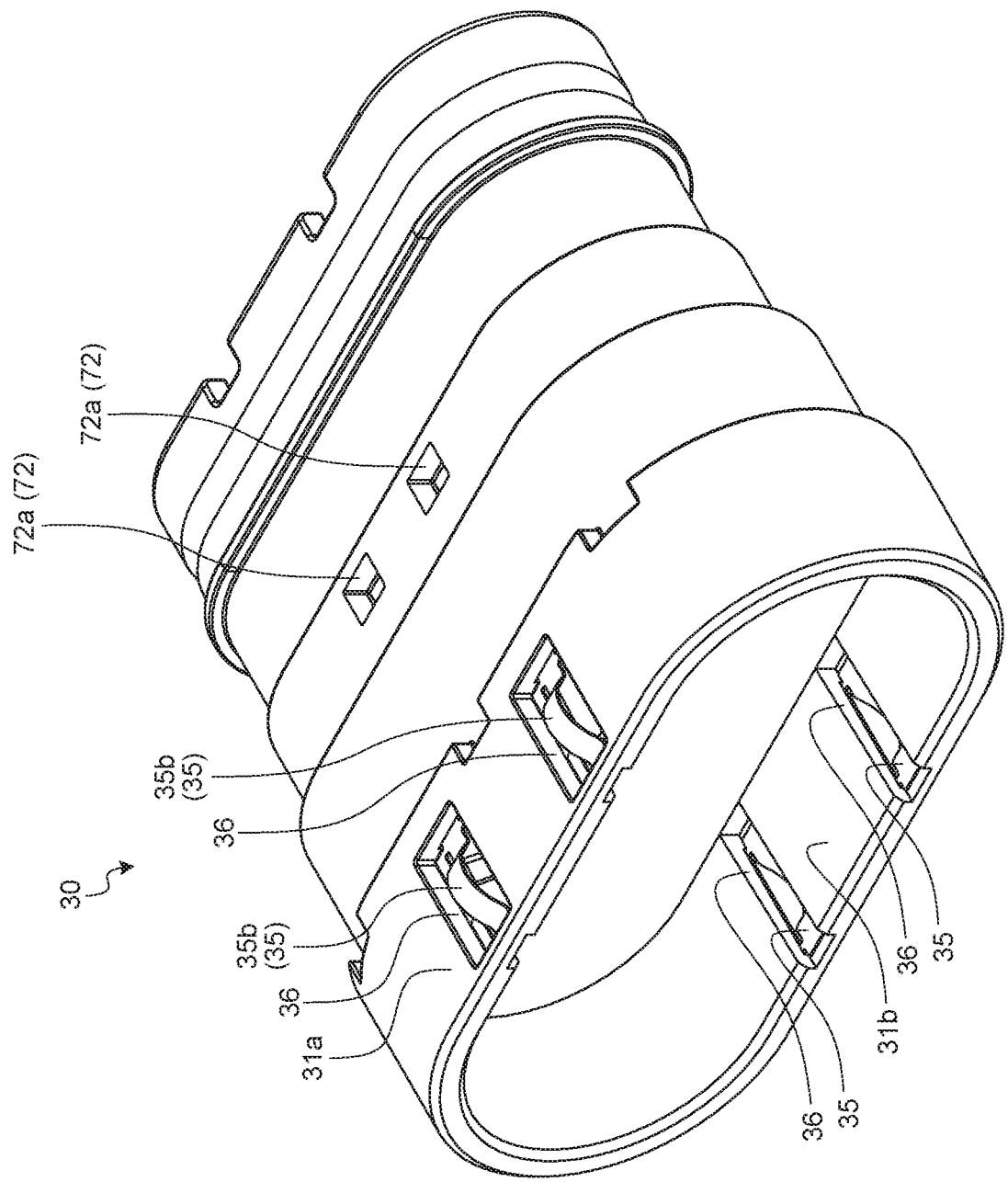
FIG. 9 is a perspective view illustrating a shield shell to which electric contacts are assembled.

The shield shell 30 is formed in an oblong sleeve shape or an angular sleeve shape. In the exemplified example, the shield shell 30 is formed as an oblong sleeve body. The respective terminal connecting portions 11 which protrude from the front holder 51 protrude from an opening of the shield shell 30 at one end, and the respective electrical wires We which are pulled out from the rear holder 52 are pulled out to the outside from an opening of the shield shell 30 at the other end. One end side of the shield shell 30 is inserted into the insertion hole 501a of the housing 501, and the other end side of the shield shell 30 protrudes to the outside from the insertion hole 501a. The shield shell 30 has, at one end side of the shield shell 30, two wall portions 31a and 31b which extend along the arrangement direction of the respective housing chambers 20a of the inner housing 20 housed in the shield shell 30 and are arranged so as to oppositely face each other in a spaced-apart manner (FIGS. 3, 4, and 9).

The shield shell 30 has electric contacts 35 which are brought into contact with inner peripheral walls $501a_1$ of the insertion holes 501a formed in the housing 501 (FIGS. 3, 6, 7, and FIGS. 9 to 12). The electric contacts 35 are disposed on portions of an outer peripheral wall side of the shield shell 30, and oppositely face inner peripheral walls of the insertion holes 501a. In this embodiment, two electric contacts 35 are disposed on each of two wall portions 31a, 31b of the outer peripheral wall of the shield shell 30.

For example, the electric contact 35 can be formed as an elastic contact configured to apply a reaction force generated by elastic deformation to an inner peripheral wall of the insertion hole 501a from a shield shell 30 side. In this case, the electric contact 35 is integrally formed with the shield shell 30, and is formed as a part of the shield shell 30. Further, the electric contact 35 may be integrally formed with the shield shell 30, may be bulged from the outer peripheral wall of the shield shell 30, and may apply a pressing force to the inner peripheral wall of the insertion hole 501a from a shield shell 30 side.

In this embodiment, the electric contacts 35 are provided as parts separate from the shield shell 30. The electric contacts 35 are elastic contact parts which are formed as parts separate from the shield shell 30 using a metal material (for example, copper or stainless steel) having conductivity and elasticity, and apply a reaction force generated by elastic deformation to the shield shell 30 and the inner peripheral walls of the insertion holes 501a. A contact assembling portion 36 which houses and holds the electric contact 35 is formed in the shield shell 30 (FIGS. 3, 6, and FIGS. 9 to 12). Two contact assembling portions 36 are formed on each of two wall portions 31a and 31b of the outer peripheral wall of the shield shell 30.

Figure 11:
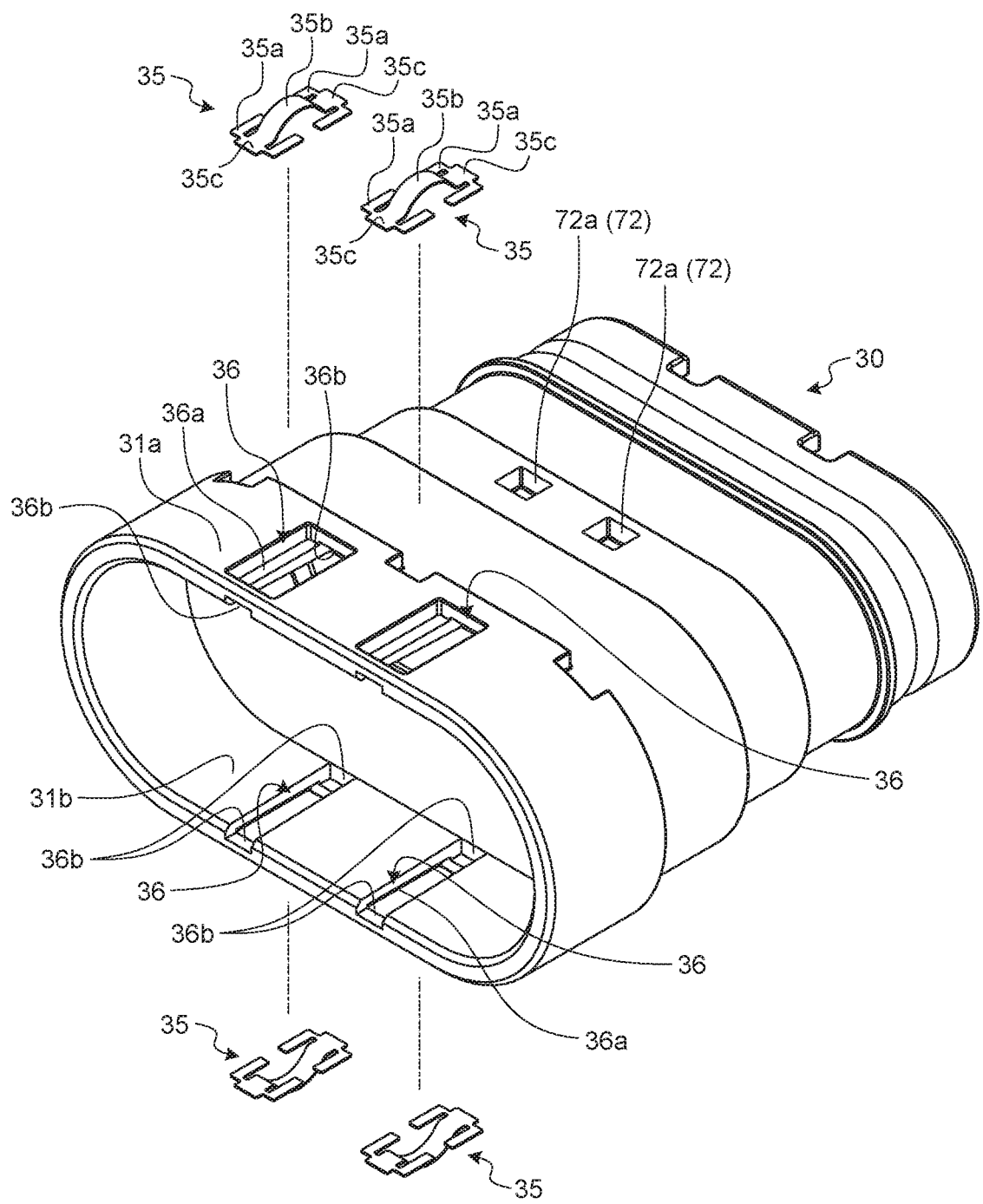
FIG. 11 is an exploded perspective view illustrating a shield shell and electric contacts.
Figure 12:
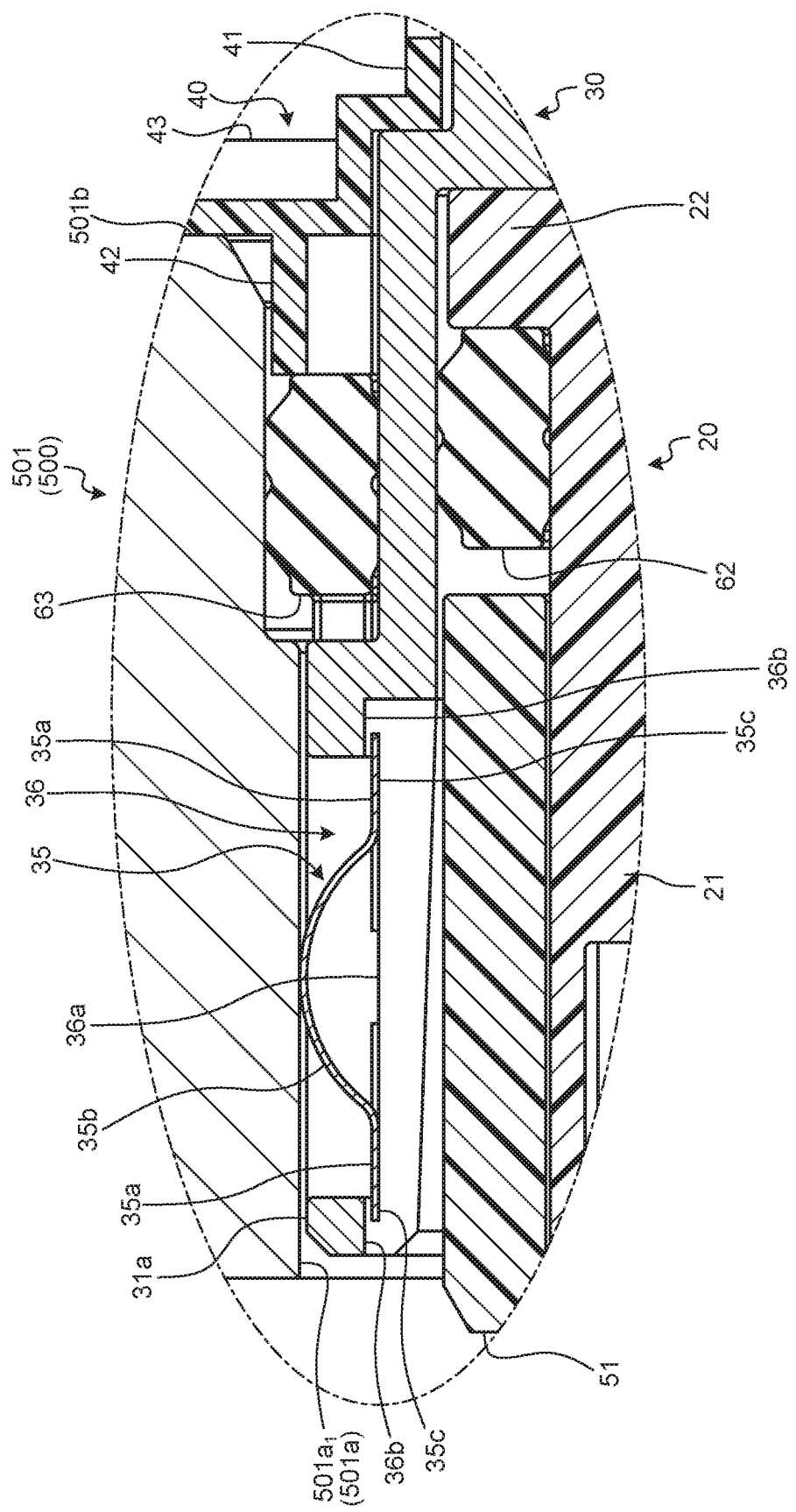
FIG. 12 is an enlarged view of a portion A illustrated in FIG. 3.

In this exemplified example, the electric contact 35 has: two proximal portions 35a arranged in a spaced-apart manner from each other; an arcuate contact portion 35b which connects two proximal portions 35a; and portions to be locked 35c which protrude toward the outside from two proximal portions 35a in an arranging direction of the respective two proximal portions 35a (FIGS. 11 and 12). The electric contacts 35 are housed in the contact assembling portion 36 from an outer peripheral wall side of the shield shell 30. Two first locking portions 36a are formed in the contact assembling portion 36 for locking the electric contacts 35 so as to prevent the removal of the electric contacts 35 into the inside of the shield shell 30 (FIGS. 11 and 12). These two first locking portions 36a lock the respective proximal portions 35a by placing two housed proximal portions 35a on these two first locking portions 36a. Further, two second locking portions 36b are formed in the contact assembling portion 36 for locking the electric contact 35 so as to prevent the removal of the electric contact 35 toward the outside of the shield shell 30 (FIGS. 11 and 12). Portions to be locked 35c are inserted into the second locking portions 36b. These two second locking portions 36b suppresses the removal of the electric contact 35 toward the outside of the shield shell 30 by locking the respective portions to be locked 35c to the peripheral portion in a state where the portions to be locked 35c are inserted into two second locking portions 36b. Arcuate top surfaces of the contact portions 35b protrude from an outer peripheral wall of the shield shell 30 in a state where the electric contacts 35 are housed in the contact assembling portion 36.

The connector 1 includes an annular liquid invasion preventing member (hereinafter, referred to as a "first liquid invasion preventing member") 62 which closes an annular gap between the outer peripheral wall of the inner housing 20 (an outer peripheral wall of the sleeve portion 21 on one end side) and an inner peripheral wall of the shield shell 30 (FIGS. 3, 5, 7, and 12). The first liquid invasion preventing member 62 is a so-called packing having liquid invasion preventing property. The first liquid invasion preventing member 62 is filled in the annular gap between the inner housing 20 and the shield shell 30 by bringing an inner peripheral wall side into close contact with an outer peripheral wall of the inner housing 20 and by bringing an outer peripheral wall side into close contact with the inner peripheral wall of the shield shell 30. In the exemplified example, the first liquid invasion preventing member 62 is arranged at the position where the first liquid invasion preventing member 62 is sandwiched between the inner housing 20 and the front holder 51 in the sleeve axis direction of the first liquid invasion preventing member 62.

Figure 10:
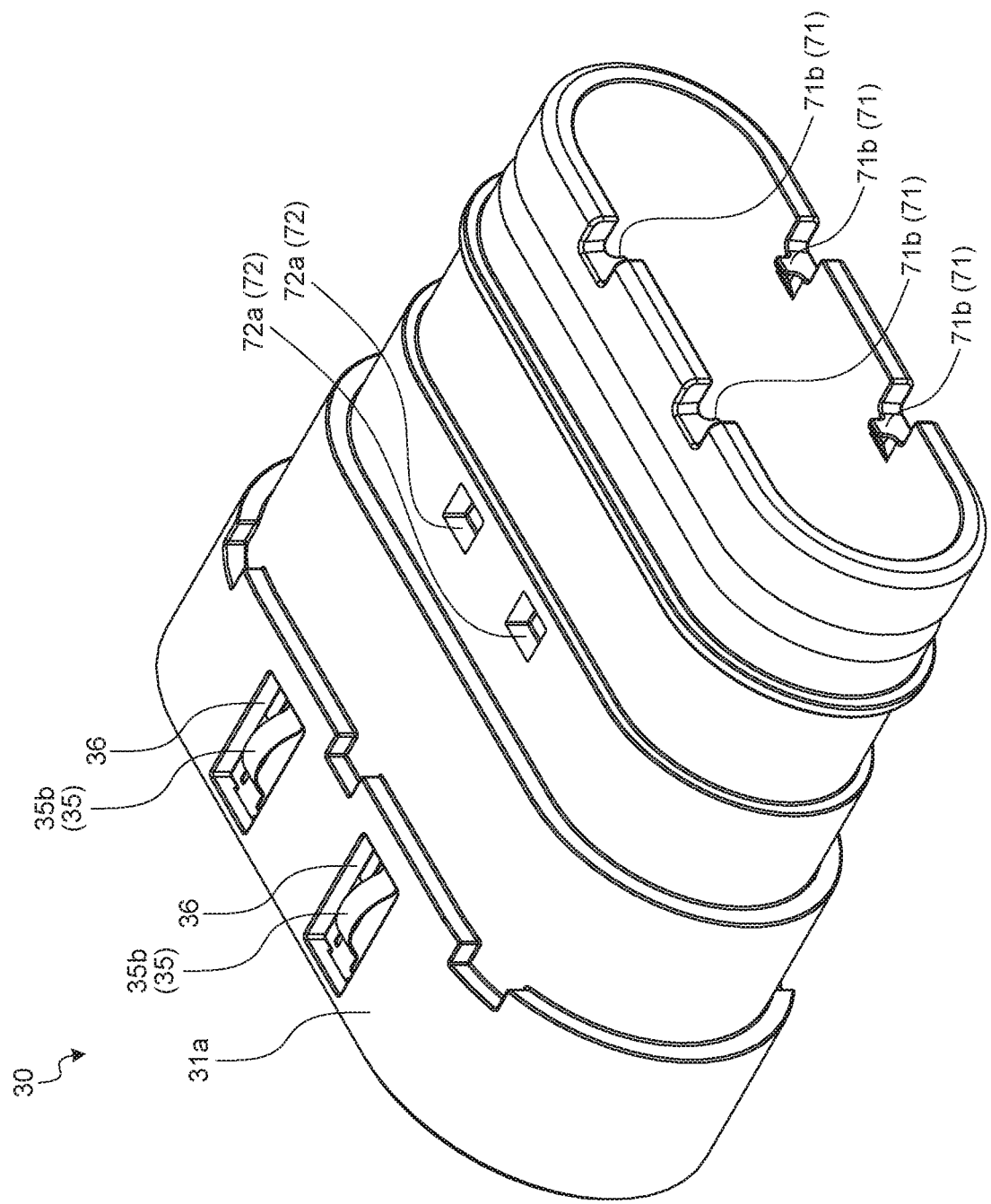
FIG. 10 is a perspective view of the shield shell to which the electric contacts are assembled as viewed from another angle.

The shield shell 30 is held by the inner housing 20 which is housed in the shield shell 30. A first holding structure 71 for holding the shield shell 30 on the inner housing 20 is disposed between the inner housing 20 and the shield shell 30 (FIG. 3). The first holding structure 71 includes: a first engaging portion 71a which is formed on the sleeve portion 21 of the inner housing 20; and a second engaging portion 71b which is formed on the shield shell 30. One of the first engaging portion 71a and the second engaging portion 71b is formed as a pawl portion, and the other of the first engaging portion 71a and the second engaging portion 71b is formed as a through-hole portion or a groove portion which locks the pawl portion due to the insertion of the pawl portion. In the exemplified example, the first engaging portion 71a is formed as the through hole portion (FIGS. 3 and 8), and the second engaging portion 71b is formed as the pawl portion (FIGS. 3 and 10). In the first holding structure 71, four pairs each of which is formed of the combination of the first engaging portion 71a and the second engaging portion 71b are disposed.

In such a configuration, lug portions 21c each of which is formed in a cantilever shape by being sandwiched by two notches are formed on the other end side of the sleeve portion 21 (FIG. 8). The lug portion 21c has resiliency, and the first engaging portion 71a is formed on a free end side of the lug portion 21c. The lug portion 21c is deflected toward a housing chamber 20a side by the second engaging portion 71b which forms the pawl portion when the inner housing 20 is housed in the shield shell 30. The deflection of the lug portion 21c is eliminated by the insertion of the second engaging portion 71b into the first engaging portion 71a. In the first holding structure 71, by eliminating the deflection of the lug portions 21c, a state is brought about where the second engaging portions 71b can be locked to peripheral portions of the first engaging portions 71a so that the shield shell 30 is held by the inner housing 20.

In the connector 1, the respective electrical wires We pulled out to the outside from the opening of the shield shell 30 on the other end are covered by a braid 81 so as to suppress the further invasion of noise from the outside (FIGS. 1 to 6). The braid 81 is a member made of a metal material and intertwined in a sleeve shape and in a meshed shape. The braid 81 covers an outer peripheral wall of the shield shell 30 on the other end side from the outside, and is brought into pressure contact with the outer peripheral wall of the shield shell 30 on the other end side using a sleeve-shaped connection member 82 (FIGS. 1 to 6). Accordingly, in the connector 1, an electrical connection state between the shield shell 30 and the braid 81 is maintained.

The outer housing 40 is formed using an insulating resin material (insulating synthetic resin material or the like). The outer housing 40 covers the shield shell 30 on a rear side in an advancing direction of the shield shell 30 at the time of inserting the shield shell 30 into the insertion hole 501a of the housing 501 together with the inner housing 20 (hereinafter, simply referred to as "advancing direction") from the outside. The outer housing 40 has a sleeve portion 41 formed in an oblong sleeve shape or an angular sleeve shape (FIGS. 1 to 5 and FIGS. 12 to 14). In the exemplified example, the sleeve portion 41 is formed in an oblong sleeve shape. The sleeve portion 41 covers an outer peripheral wall of the shield shell 30 on the other end side and in front of the braid 81 and the connection member 82 in the advancing direction.

The outer housing 40 has an annular fitting portion 42 which is disposed coaxially with the sleeve portion 41 and is fitted in the insertion hole 501a of the housing 501 (FIGS. 3, 4, 6, and FIGS. 12 to 14). The fitting portion 42 protrudes from one end of the sleeve portion 41. An outer peripheral wall of the fitting portion 42 engages with an inner peripheral wall of the insertion hole 501a by fitting and hence, the invasion of a liquid into the insertion hole 501a from the outside through between the outer peripheral wall and the inner peripheral wall is suppressed.

The outer housing 40 has an annular flange portion 43 which is disposed coaxially with the sleeve portion 41 and the fitting portion 42, and is arranged between the sleeve portion 41 and the fitting portion 42 (FIGS. 1 to 6 and FIGS. 12 to 14). The flange portion 43 protrudes from the respective outer peripheral walls of the sleeve portion 41 and the fitting portion 42, and is formed in an annular shape in conformity with a circumferential direction of the outer peripheral wall. A wall surface 43a of the flange portion 43 on a fitting portion 42 side (FIGS. 6 and 13) is formed in a planar shape, and is brought into contact with a first wall surface 501b (FIGS. 1 and 5) having a planar shape of an outer wall surface of the housing 501 around the insertion hole 501a.

Figure 5:
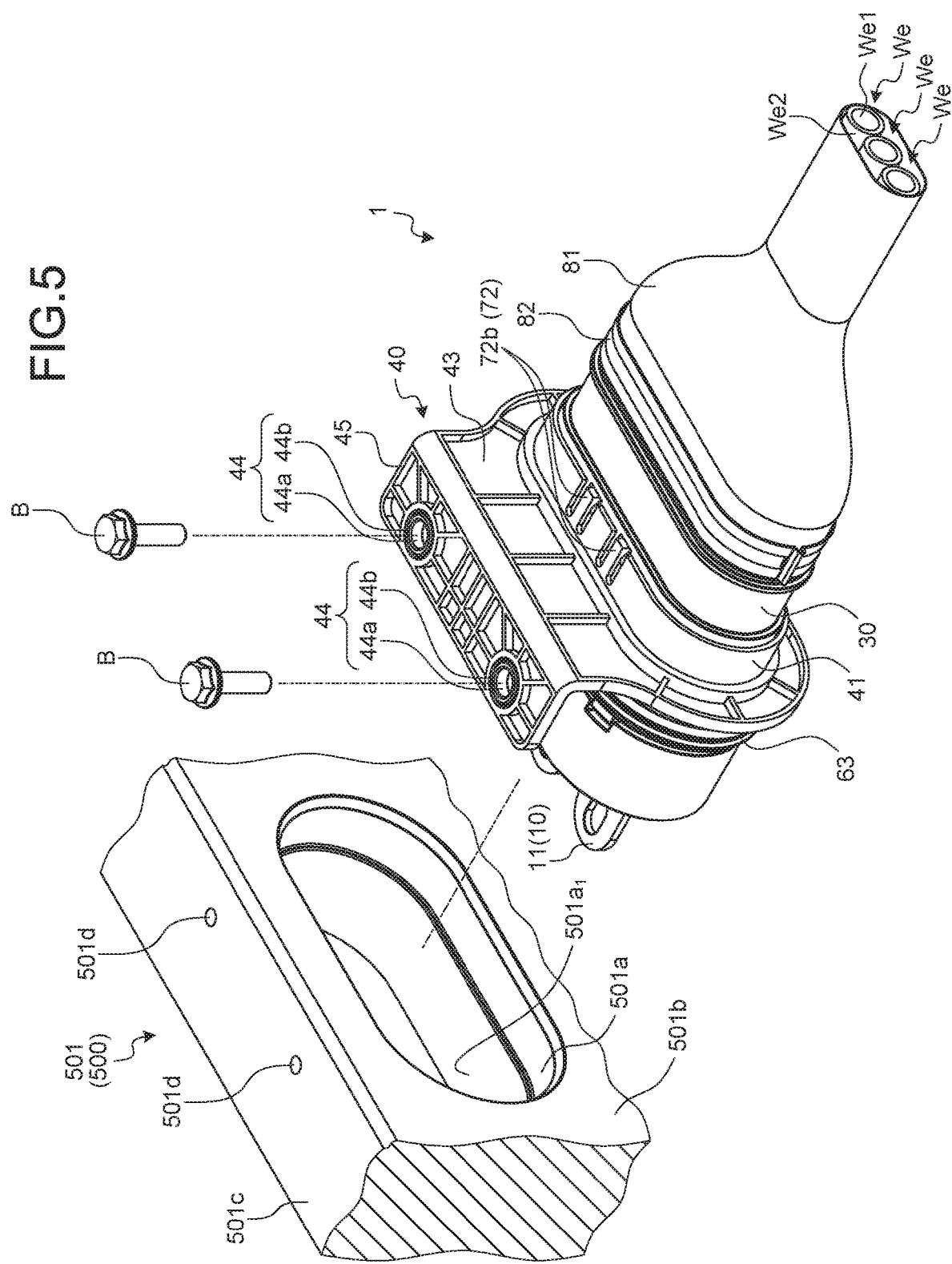
FIG. 5 is a perspective view illustrating the connector of the embodiment before being mounted on the counterpart device.

The outer housing 40 has fixing portions 44 for fixing the outer housing 40 to the housing 501 (FIGS. 1 to 6, FIG. 13 and FIG. 14). For example, in this embodiment, an outer wall surface of the housing 501 has a second wall surface 501c which is connected to the first wall surface 501b in an orthogonal state (FIGS. 1 to 5). The outer housing 40 is fixed to the housing 501 by mounting the fixing portion 44 on the second wall surface 501c of the outer housing 40. Accordingly, to enable such fixing, portions to be fixed 501d on which the fixing portions 44 are mounted are formed on the second wall surface 501c (FIGS. 4 and 5). In the exemplified example, the combination of the fixing portion 44 and the portion to be fixed 501d which form a pair is disposed at two portions.

In the exemplified example, the fixing portions 44 includes a lug portion 45 which is connected to the flange portion 43 in an orthogonal state (FIGS. 1 to 6, FIG. 13 and FIG. 14). The fixing portion 44 has: a circular through hole 44a formed in the lug portion 45; and a circular cylindrical collar member 44b fitted into the through-hole 44a coaxially (FIGS. 4 to 6, FIG. 13 and FIG. 14). Both ends of the collar member 44b in a sleeve axis direction protrude from the lug portion 45. Accordingly, in the collar member 44b, one circular annular end surface is brought into contact with the second wall surface 501c. On the center of the circular annular contact surface of the second wall surface 501c, a female threaded portion where threads are coaxially formed with a sleeve axis of the collar member 44b is formed as the portion to be fixed 501d. The fixing portion 44 is mounted on the second wall surface 501c by making a male threaded member B (FIGS. 1 to 5) threadedly engage with the portion to be fixed 501d.

In this embodiment, the collar member 44b is formed using a metal material, for example. Accordingly, it is desirable that the collar member 44b be formed using a metal material having the same or the substantially same ionization tendency as the housing 501 with which one circular annular end surface of the collar member 44b is brought into contact. Accordingly, in the connector 1, the occurrence of electrolytic corrosion between the collar member 44b and the housing 501 can be suppressed. Also in the case where the male threaded member B is formed using a metal material, it is desirable that the male threaded member B be formed using a metal material having the same or the substantially same ionization tendency as the housing 501. Accordingly, in the connector 1, the occurrence of electrolytic corrosion between the male threaded member B and the housing 501 can be suppressed.

There may be case where the collar member 44b is formed using a metal material having ionization tendency which largely differs from ionization tendency of a metal material or the housing 501. In this case, it is desirable to apply surface treatment to the collar member 44b using a material having the same or the substantially same ionization tendency as the housing 501. For example, in the case where the housing 501 is formed using aluminum, anodizing or tin plating may be applied to the surface of the collar member 44b. As surface treatment applied to the collar member 44b, insulating coating (for example, coating using an insulating synthetic resin material) may be applied to the surface of the collar member 41b. Also by adopting such surface treatment, in the connector 1, it is possible to suppress the occurrence of electrolytic corrosion between the collar member 44b and the housing 501. Also there may be a case where the male threaded member B is formed using a metal material having ionization tendency which largely differs from ionization tendency of a metal material of the housing 501. In this case, it is desirable to apply surface treatment to the male threaded member B using a material having the same or the substantially same ionization tendency as a material of the housing 501, or it is desirable to apply surface treatment to the male threaded member B using insulating coating. Accordingly, in the connector 1, the occurrence of electrolytic corrosion between the male threaded member B and the housing 501 can be suppressed.

Provided that the collar member 44b can ensure a desired amount of rigidity, the collar member 14b formed of an insulating synthetic resin material may be also used.

The connector 1 includes an annular liquid invasion preventing member (hereinafter, referred to as a "second liquid invasion preventing member") 63 which closes an annular gap between the outer peripheral wall of the shield shell 30 and the inner peripheral wall 501$a_1$ of the insertion hole 501a of the housing 501 (FIGS. 3 to 6 and FIG. 12). The second liquid invasion preventing member 63 is a so-called packing having liquid invasion preventing property. An inner peripheral wall side of the second liquid invasion preventing member 63 is brought into contact with the outer peripheral wall of the shield shell 30, and an outer peripheral wall of the second liquid invasion preventing member 63 is brought into contact with the inner peripheral wall 501$a_1$ of the insertion hole 501$a$ of the housing 501. With such a configuration, an annular gap between the shield shell 30 and the insertion hole 501$a$ of the housing 501 can be filled by the second liquid invasion preventing member 63. The exemplified second liquid invasion preventing member 63 is disposed at the position where the second liquid invasion preventing member 63 is sandwiched between the outer housing 40 and the shield shell 30 in the sleeve axis direction.

Figure 13:
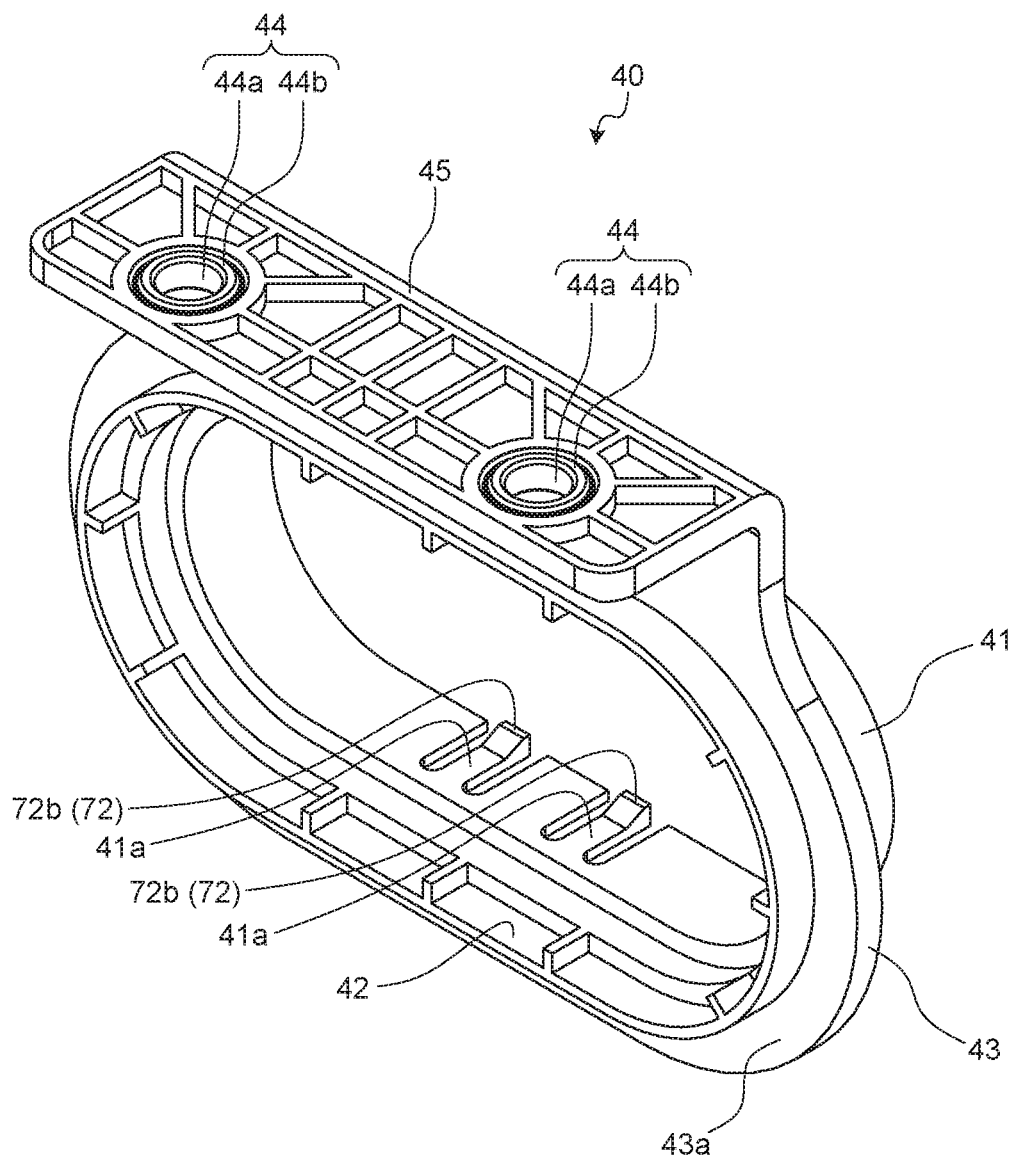
FIG. 13 is a perspective view illustrating an outer housing.
Figure 14:
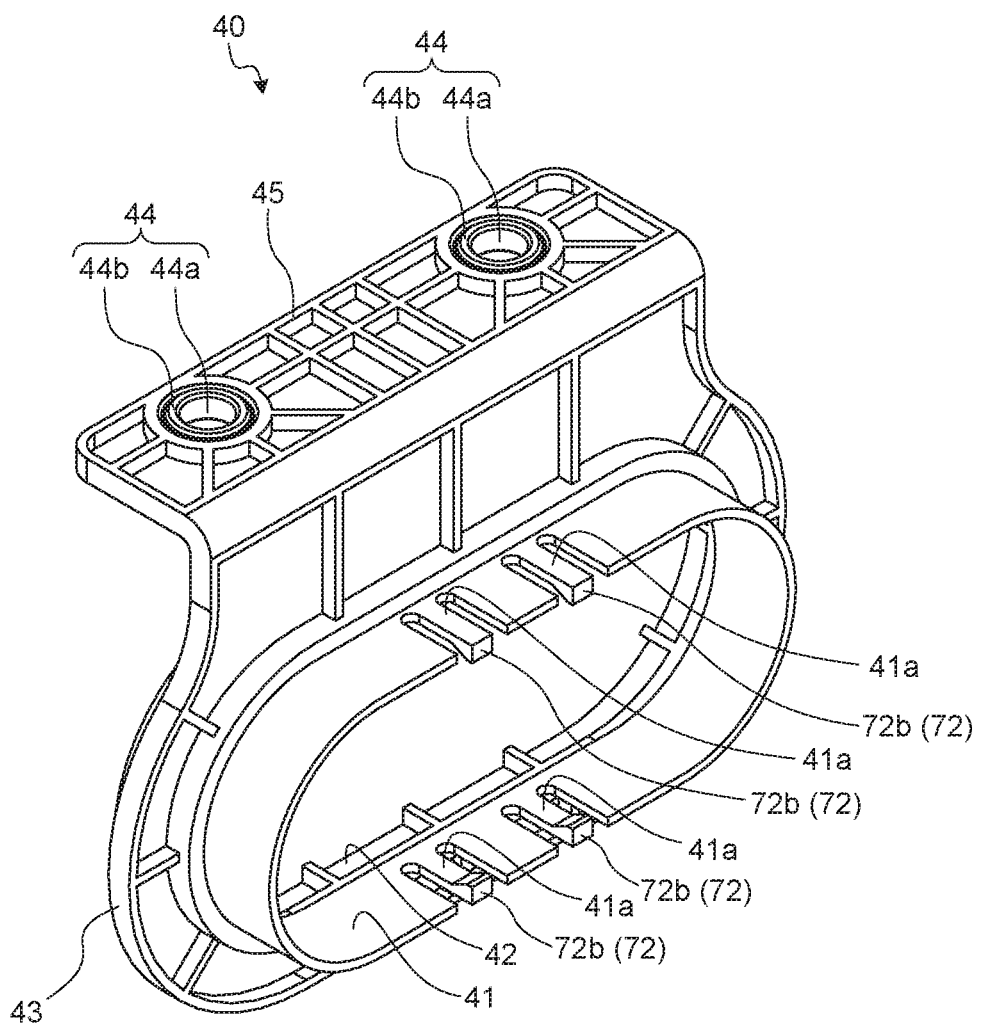
FIG. 14 is a perspective view of the outer housing as viewed from another angle.

The outer housing 40 is held by the shield shell 30. A second holding structure 72 for holding the outer housing 40 on the shield shed 30 is disposed between the shield shell 30 and the outer housing 40 (FIG. 2). The second holding structure 72 includes: first engaging portions 72$a$ formed on the shield shell 30 and; second engaging portions 72$b$ formed on the sleeve portion 41 of the outer housing 40. One of the first engaging portion 72$a$ and the second engaging portion 72$b$ is formed as pawl portions. The other of the first engaging portion 72$a$ and the second engaging portion 72$b$ is formed as through-hole portions or groove portions for locking the pawl portion along with the insertion of the pawl portion. In the exemplified example, the first engaging portions 72$a$ are formed as through hole portions (FIG. 2 and FIGS. 9 to 11), and the second engaging portions 72$b$ are formed as pawl portions (FIGS. 13 and 14). In the second holding structure 72, four pairs each of which is formed of the combination of the first engaging portion 72$a$ and the second engaging portion 72$b$ are disposed.

In the connector 1, the electric contacts 35 are disposed in front of the first liquid invasion preventing member 62 and the second liquid invasion preventing member 63 in an advancing direction (FIG. 12). With such a configuration, in the connector 1, for example, even when a liquid such as water invades between the inner housing 20 and the shield shell 30 from the outside, the first liquid invasion preventing member 62 blocks the liquid. Accordingly, it is possible to prevent the invasion of the liquid into the electric contacts 35 through between the inner housing 20 and the shield shell 30. Further, in the connector 1, for example, even when a liquid such as water invades between the shield shell 30 and the insertion hole 501$a$ of the housing 501 after flowing through between the flange portion 43 of the outer housing 40 and the first wall surface 501$b$ of the housing 501, the second liquid invasion preventing member 63 blocks the liquid. Accordingly, it is possible to suppress the invasion of the liquid into the electric contacts 35 through between the shield shell 30 and the insertion hole 501$a$ of the housing 501.

Further, in this connector 1, the fitting portion 42 of the outer housing 40 is fitted in the insertion hole 501$a$ of the housing 501 behind the second liquid invasion preventing member 63 in the advancing direction (FIG. 12). In this connector 1, a creeping distance between the outer housing 40 and the housing 501 can be extended by the fitting portion 42. Accordingly, in this connector 1, even when a liquid such as water flows through between the flange portion 43 of the outer housing 40 and the first wall surface 501$b$ of the housing 501, the liquid is guided to a gap between the outer peripheral wall of the fitting portion 42 and the inner peripheral wall 501$a_1$ of the insertion hole 501$a$. Accordingly, an amount of the liquid which reaches the second liquid invasion preventing member 63 can be reduced. Accordingly, in the connector 1, a liquid invasion preventing performance of the second liquid invasion preventing member 63 can be improved.

In the connector 1 of this embodiment described above, the connector 1 is fixed to the housing 501 made of a metal material by way of the outer housing 40 made of an insulating resin material. Accordingly, in the connector 1, even when a liquid such as water invades between the outer housing 40 and the housing 501, electrolytic corrosion does not occur between the outer housing 40 and the housing 501 and hence, the durability of the outer housing 40 and the housing 501 can be improved.

In the connector 1 of this embodiment, the outer housing 40 is fixed to the housing 501 by mounting the collar members 44$b$ on the fixing portion 44 of the outer housing 40 and by making the male threaded members B threadedly engage with portions to be fixed 501$d$ which form female threaded portions of the housing 501. In this case, as described previously, in this connector 1, the collar members 44$b$ and the male threaded members B are formed as members which can suppress the occurrence of electrolytic corrosion between the male threaded members B and the housing 501 and the collar member 44$b$ and the housing 501. Accordingly, in the connector 1, even when a liquid such as water invades between the collar member 44$b$ and the housing 501, or even when a liquid such as water invades between the male threaded member B and the portion to be fixed 501$d$, the occurrence of electrolytic corrosion between these members can be suppressed. As a result, durability of the collar members 44$b$, the male threaded member B, and the housing 501 can be improved.

In the connector 1 of this embodiment, the electric contacts 35 are disposed in front of the first liquid invasion preventing member 62 and the second liquid invasion preventing member 63 in an advancing direction and hence, as described previously, the invasion of a liquid to the electric contacts 35 can be suppressed. Accordingly, with the connector 1, the occurrence of electrolytic corrosion between the electric contacts 35 and the housing 501 can be suppressed and hence, durability of the electric contacts 35 and the housing 501 can be improved.

In the connector 1 of this embodiment, the fitting portion 42 of the outer housing 40 is fitted in the insertion hole 501$a$ of the housing 501 behind the second liquid invasion preventing member 63 in an advancing direction. Accordingly, as described previously, a liquid invasion preventing performance brought about by the second liquid invasion preventing member 63 can be improved. As a result, the connector 1 can further suppress the occurrence of electrolytic corrosion between the electric contacts 35 and the housing 501 and hence, durability of the electric contacts 35 and the housing 501 can be further improved.

In this manner, the connector 1 according to this embodiment can improve not only the durability of the connector itself but also the durability of the counterpart device 500.

Modification

Figure 15:
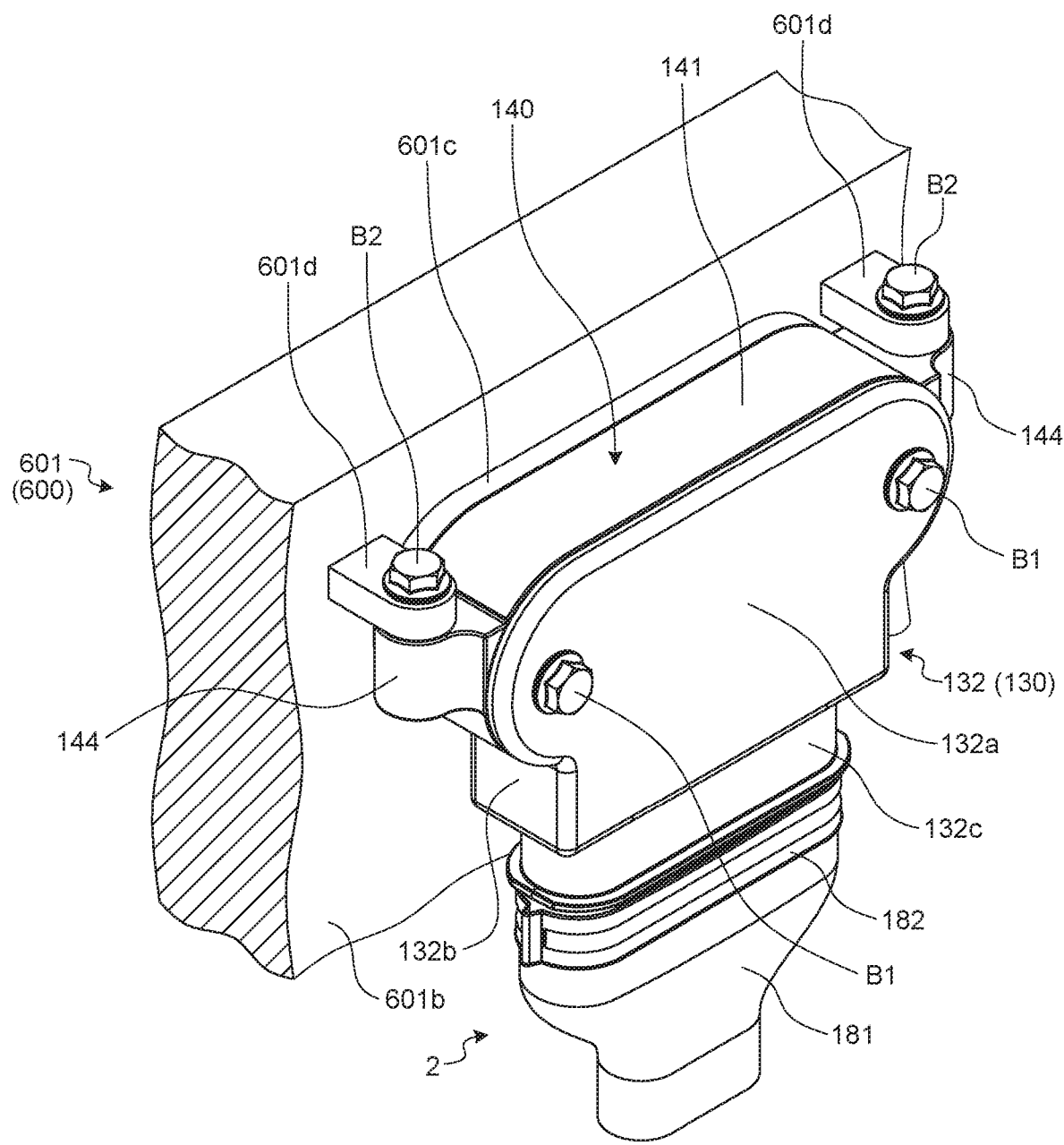
FIG. 15 is a perspective view illustrating a connector according to a modification mounted on a counterpart device.
Figure 16:
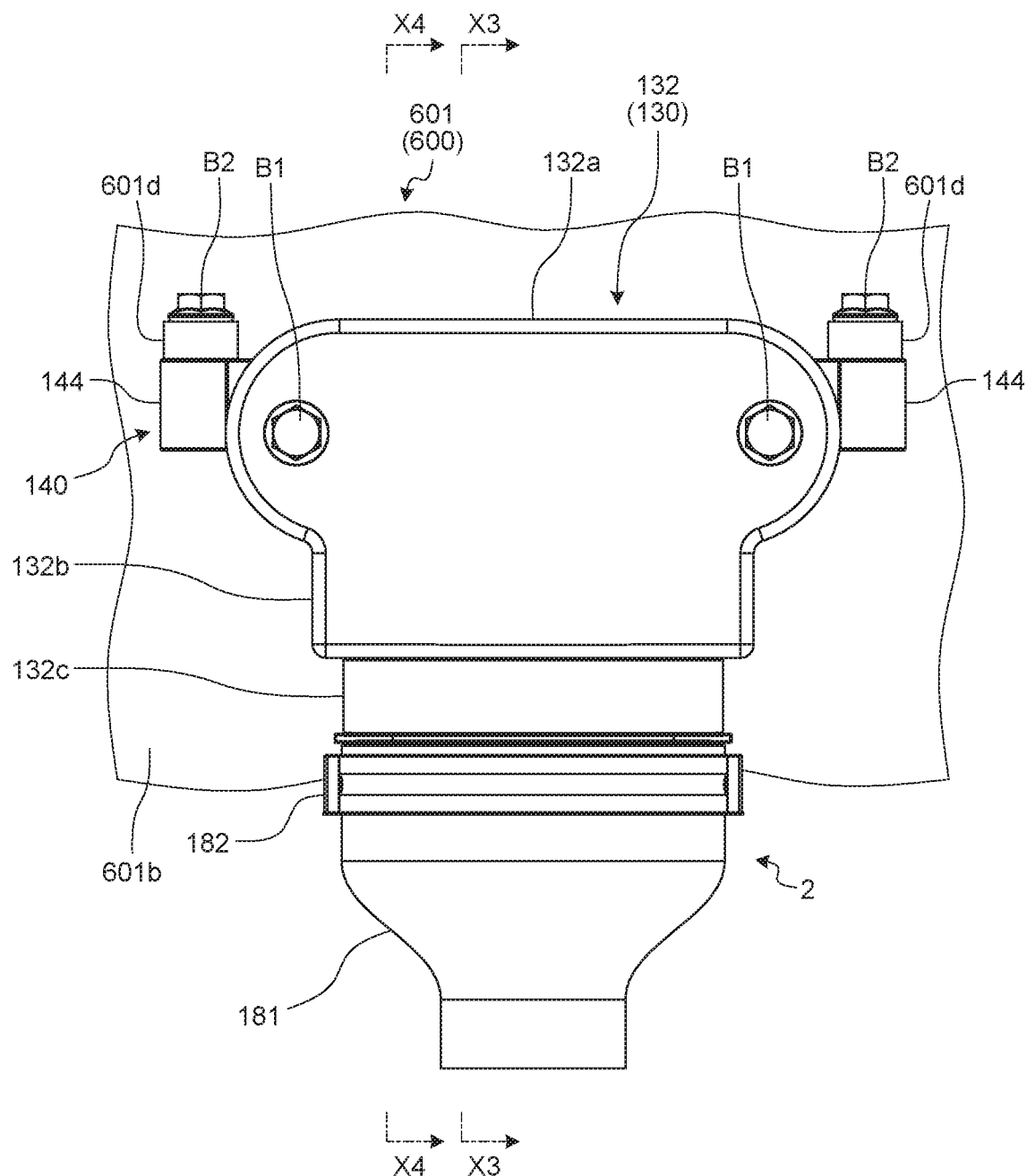
FIG. 16 is a plan view illustrating a connector according to the modification mounted on the counterpart device.
Figure 17:
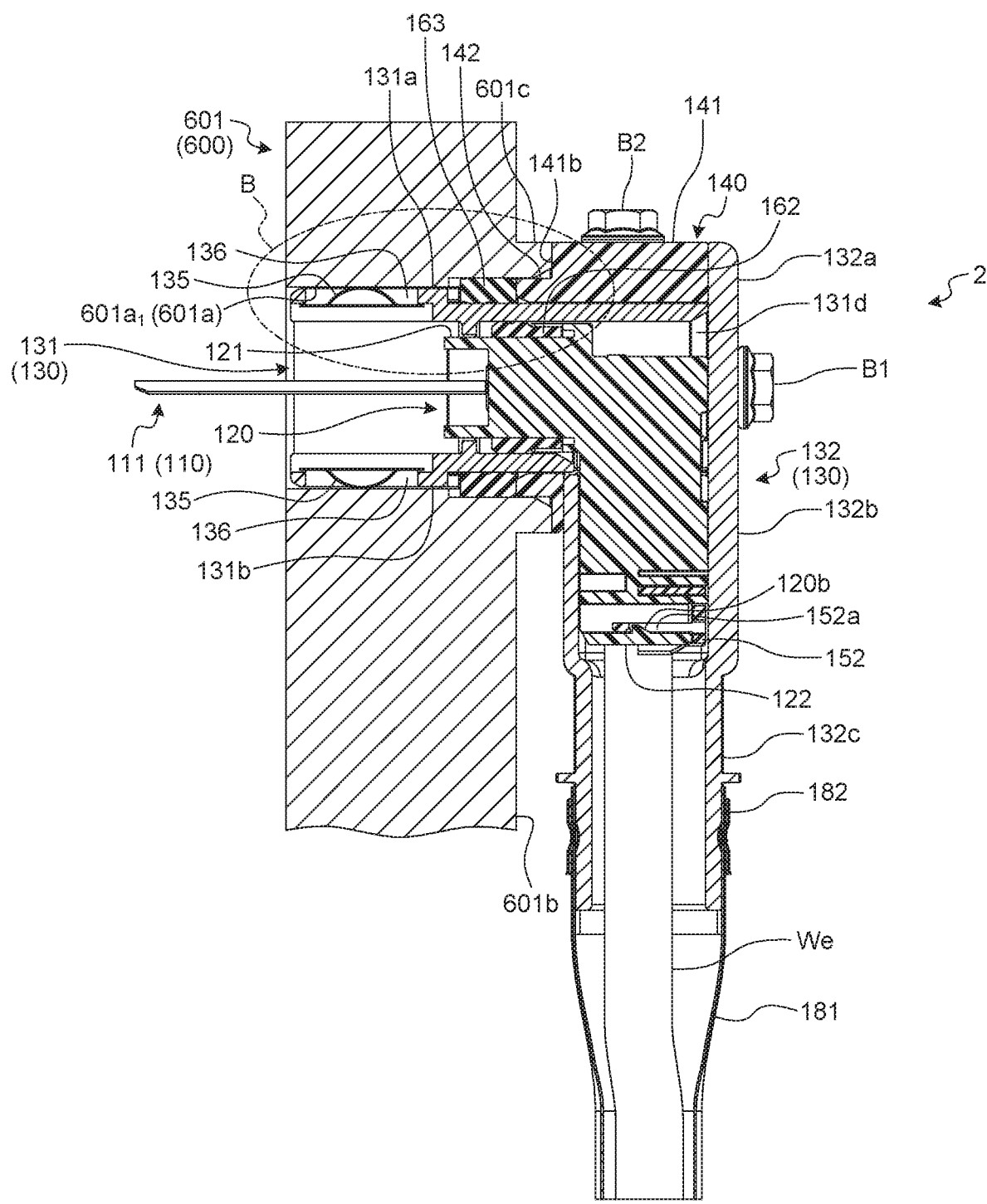
FIG. 17 is a cross-sectional view taken along line X3-X3 in FIG. 16.
Figure 18:
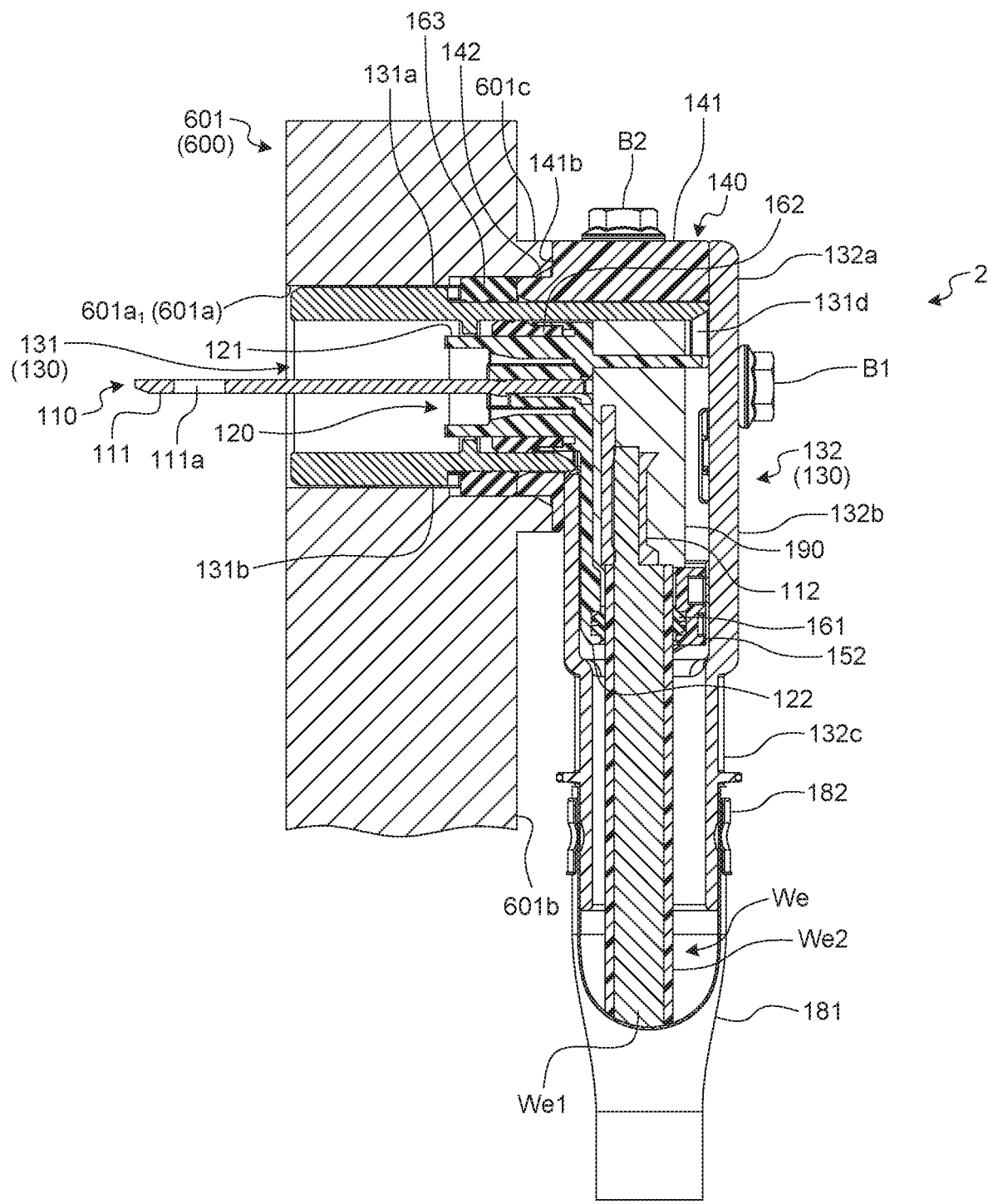
FIG. 18 is a cross-sectional view taken along line X4-X4 in FIG. 16.
Figure 21:
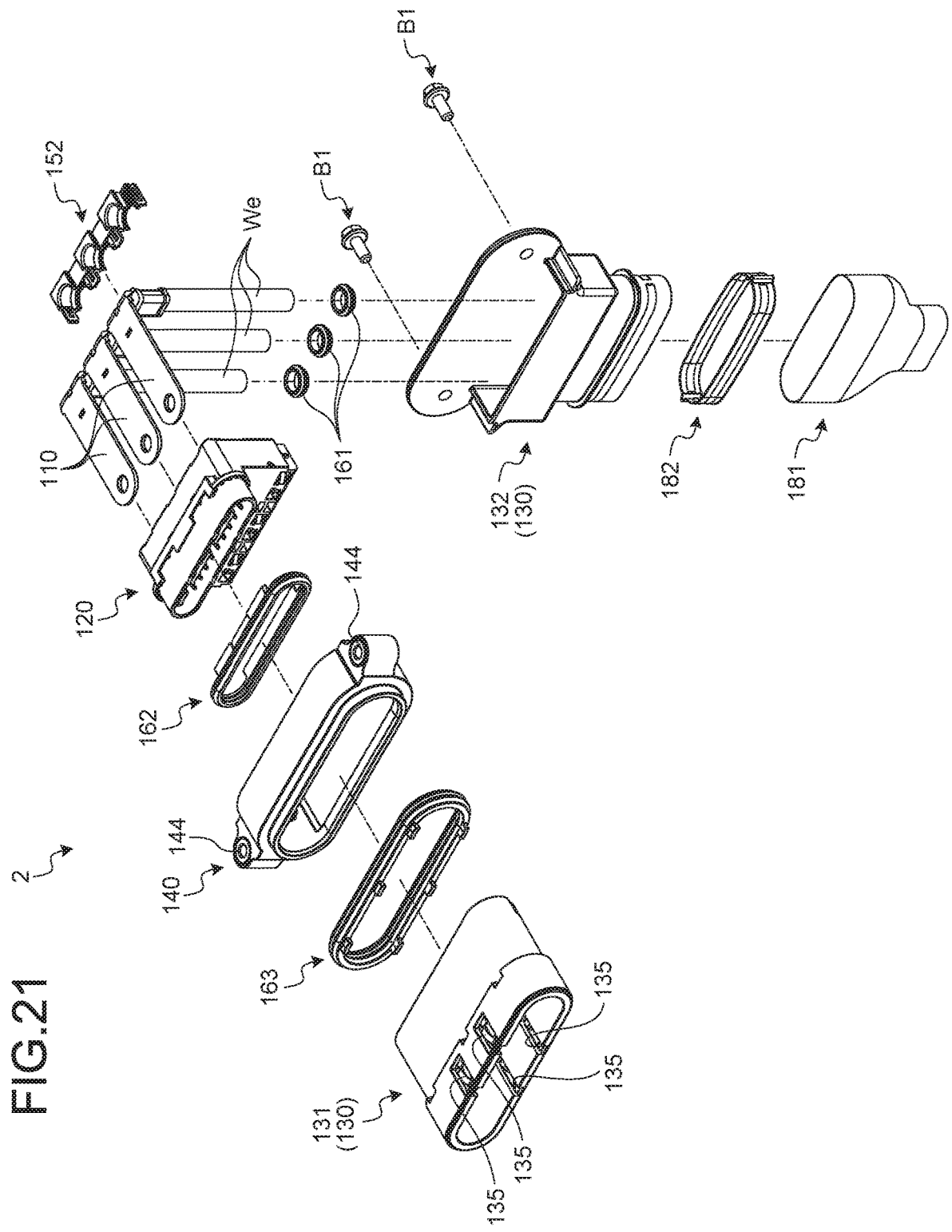
FIG. 21 is an exploded perspective view illustrating a connector according to the modification.

Reference numeral 2 in FIGS. 15 to 21 indicates a connector of this modification. In the same manner as the connector 1 of the previously mentioned embodiment, an electrical connection is established between a counterpart device 600 and a device (not illustrated in the drawing) disposed on distal end sides of a electrical wire We by electrically connecting a connector 2 to counterpart terminals (not illustrated in the drawings) of the counterpart device 600 (FIGS. 15 to 18). The connector 2 includes a terminal 110, an inner housing 120, a shield shell 130, and an outer housing 140 (FIGS. 17, 18, and 21).

The terminal 110 is formed using a metal material. This terminal 110 has terminal connecting portions 111 and electrical wire connecting portions 112 in the same manner as the terminal 10 of the embodiment, and a through hole 111a is formed in each terminal connecting portion 111 (FIG. 18). However, the terminal 110 of this modification is formed in an L-shape such that the terminal connecting portion 111 and the electrical wire connecting portion 112 are bent from each other at 90 degrees. In this terminal 110, in the same manner as the terminal 10 of the embodiment, an electrical connection is established between the counterpart device 600 and an equipment disposed on a distal end of the electrical wire We by inserting the terminal connecting portions 111 into insertion holes 601a (FIGS. 17 to 19) formed in a metal-made housing 601 of the counterpart device 600, and by physically and electrically connecting the terminal connecting portions 111 to counterpart terminals of the counterpart device 600. Also in this modification, the connector 2 includes three sets of combinations of the terminal 110 and the electrical wire We where the terminal 110 and the electrical wire We form a pair.

Figure 23:
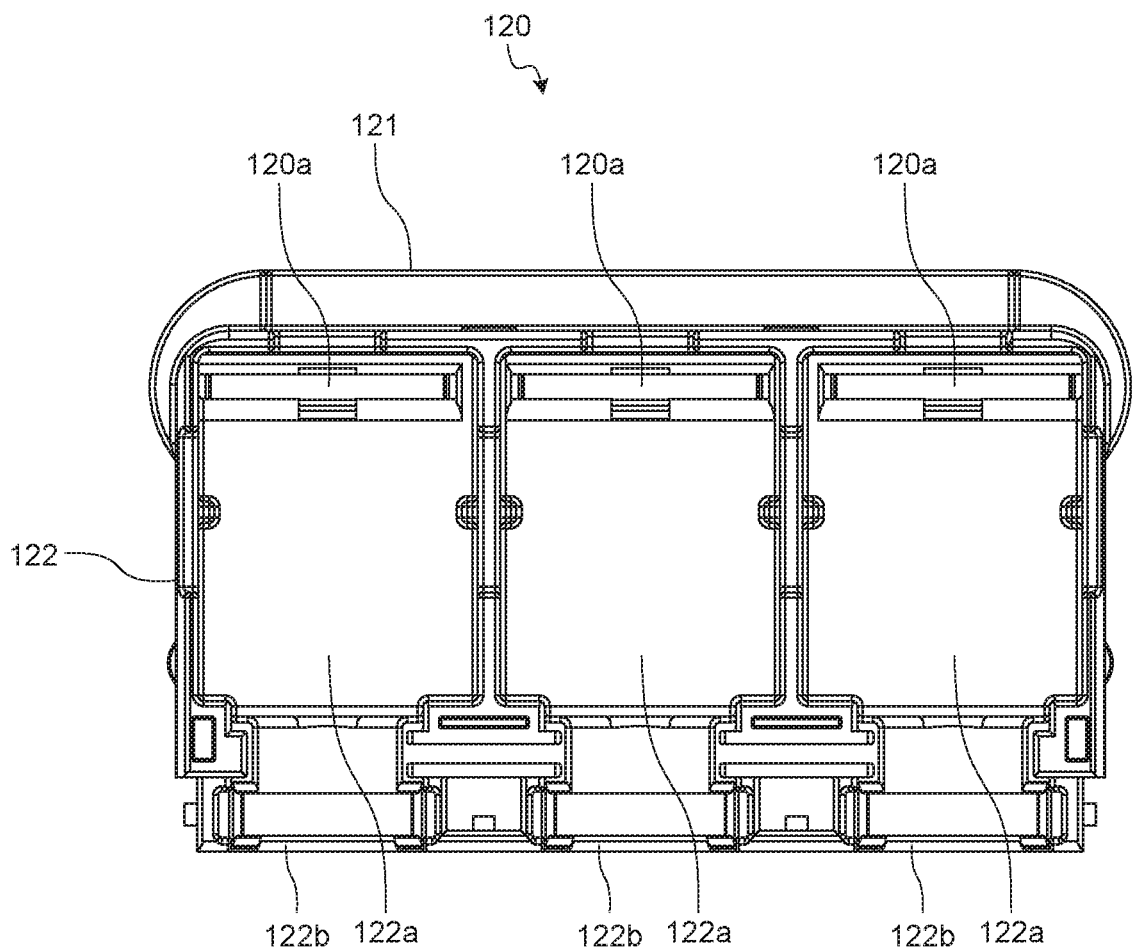
FIG. 23 is a plan view illustrating the inner housing according to the modification.

The inner housing 120 is formed using an insulating resin material (an insulating synthetic resin material or the like), for example. Housing chambers 120a are formed in the inner housing 120 in the same manner as the inner housing 20 of the embodiment. The housing chamber 120a is a chamber for each combination of the terminal 110 and the electrical wire We which form a pair, and houses the terminal 110 and the electrical wire We (FIG. 23). However, in the inner housing 120 of this modification, the housing chamber 120a is also formed in an L-shape in conformity with the L-shaped terminal 110 and a pull-out direction of the electrical wire We connected to the terminal 110.

In the exemplified example, the inner housing 120 has: a sleeve portion 121 formed in an oblong sleeve shape or an angular sleeve shape; and a box portion 122 formed as a rectangular parallelepiped box body (FIGS. 17, 18, 22 and 23). In the exemplified example, the sleeve portion 121 is formed in an oblong sleeve shape. In the inner housing 120, the sleeve portion 121 and the box portion 122 are disposed forming an L shape, and the housing chambers 120a are formed in the sleeve portion 121 and the box portion 122 respectively along the L shape.

In the inner housing 120, an opening disposed at one ends of the housing chambers 120a is formed at one end of the sleeve portion 121, and the terminal connecting portions 111 of the terminal 110 protrude toward the outside of the housing chambers 120a from this opening. The sleeve portion 121 is inserted into the insertion hole 601a of the housing 601 together with the terminal connecting portions 111. The terminal connecting portions 111 are held in the housing chambers 120a by being press-fitted into the housing chambers 120a of the sleeve portion 121. By making a gap between the housing chamber 120a of the sleeve portion 121 and the terminal connecting portion 111 as small as possible, it is possible to suppress the inflow of a potting agent in a liquid form described later which is filled in the housing chamber 120a of the box portion 122.

Figure 22:
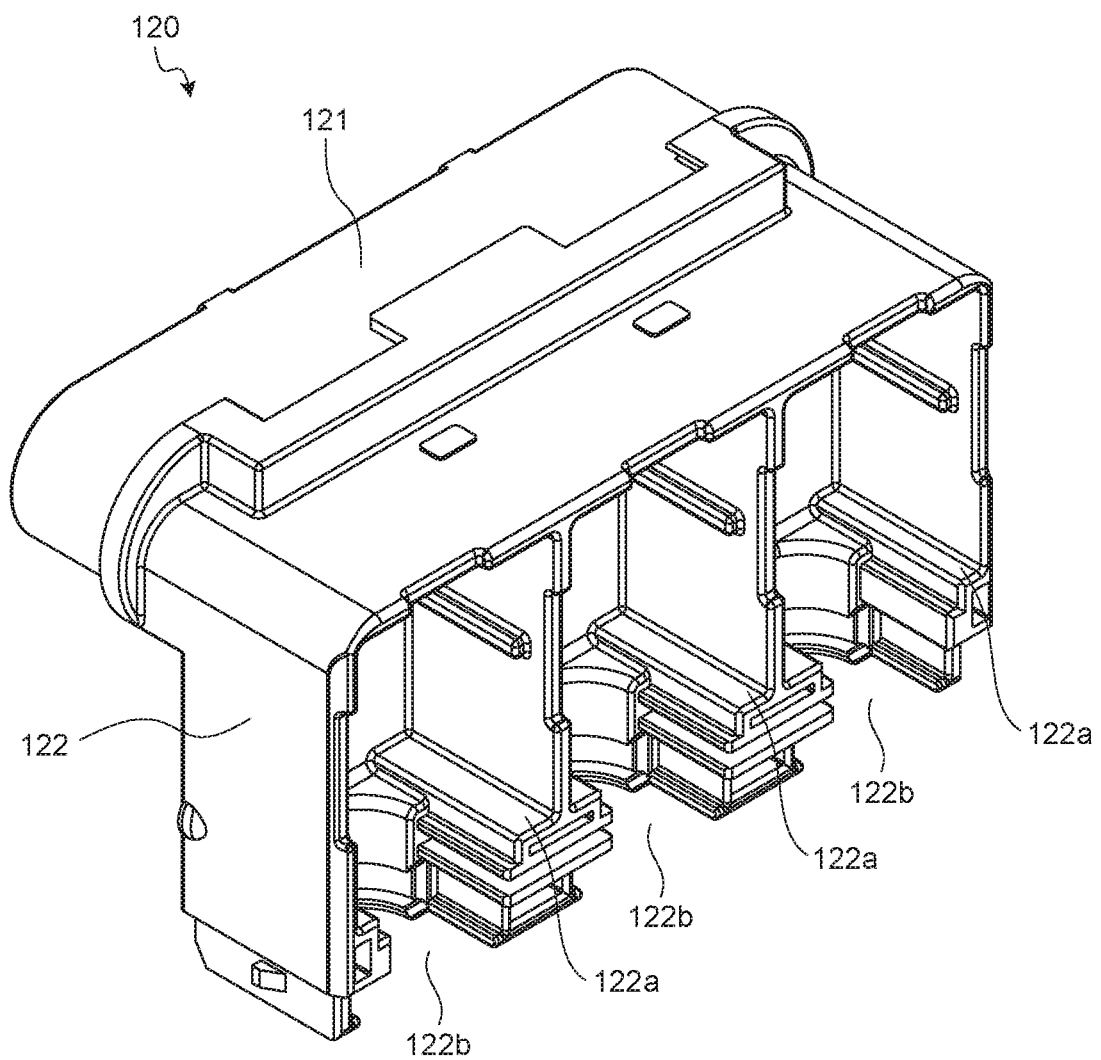
FIG. 22 is a perspective view illustrating an inner housing according to the modification.

The box portion 122 has: a first opening 122a disposed orthogonal to a sleeve axis direction of the sleeve portion 121; and a second opening 122b which is disposed orthogonal to the first opening 122a and is connected to the first opening 122a for each housing chamber 120a (FIGS. 22 and 23). The first opening 122a is used as an insertion opening for housing the combination of the terminal 110 and the electrical wire We in the housing chamber 120a. On the other hand, the second opening 122b is used as a electrical wire pull-out opening for pulling out the electrical wire We to the outside of the housing chamber 120a.

The connector 2 includes a rear holder 152 which holds the electrical wire We disposed in the second opening 122b, by clamping the electrical wire We together with a rubber plug 161 (FIGS. 18 and 21). The rear holder 152 is formed using, for example, an insulating resin material (insulating synthetic resin material or the like). The rear holder 152 has a semicircular opening for each second opening 122b, and the electrical wire pull-out opening is formed by the opening and the second opening 122b. The rear holder 152 is held by the inner housing 120 in such a manner that a pawl portion 120b of the inner housing 120 is inserted into a through hole 152a formed in a resilient lug portion which the rear holder 152 has (FIG. 17). The rubber plug 161 is provided for suppressing a potting agent in a liquid form filled in the housing chamber 120a of the box portion 122 from flowing out from the housing chamber 120a. For this end, an annular gap between the electrical wire We and the electrical wire pull-out opening is filled by bringing an inner peripheral wall side of the rubber plug 161 into close contact with a coating We2 of the electrical wire We and by bringing an outer peripheral wall side of the rubber plug 161 into close contact with respective inner peripheral walls of the housing chamber 120a and the rear holder 152.

The shield shell 130 is formed using a metal material (for example, stainless steel) for suppressing the invasion of noise from the outside. In the same manner as the shield shell 30 of the embodiment, a sleeve body which houses the inner housing 120 and is inserted into the insertion hole 601a of the housing 601 is disposed in the shield shell 130. However, the shield shell 130 of this modification adopts a two-split structure formed of an inner shell 131 and an outer shell 132. The inner shell 131 and the outer shell 132 form the sleeve body of the shield shell 130 (FIGS. 17 to 21).

Figure 24:
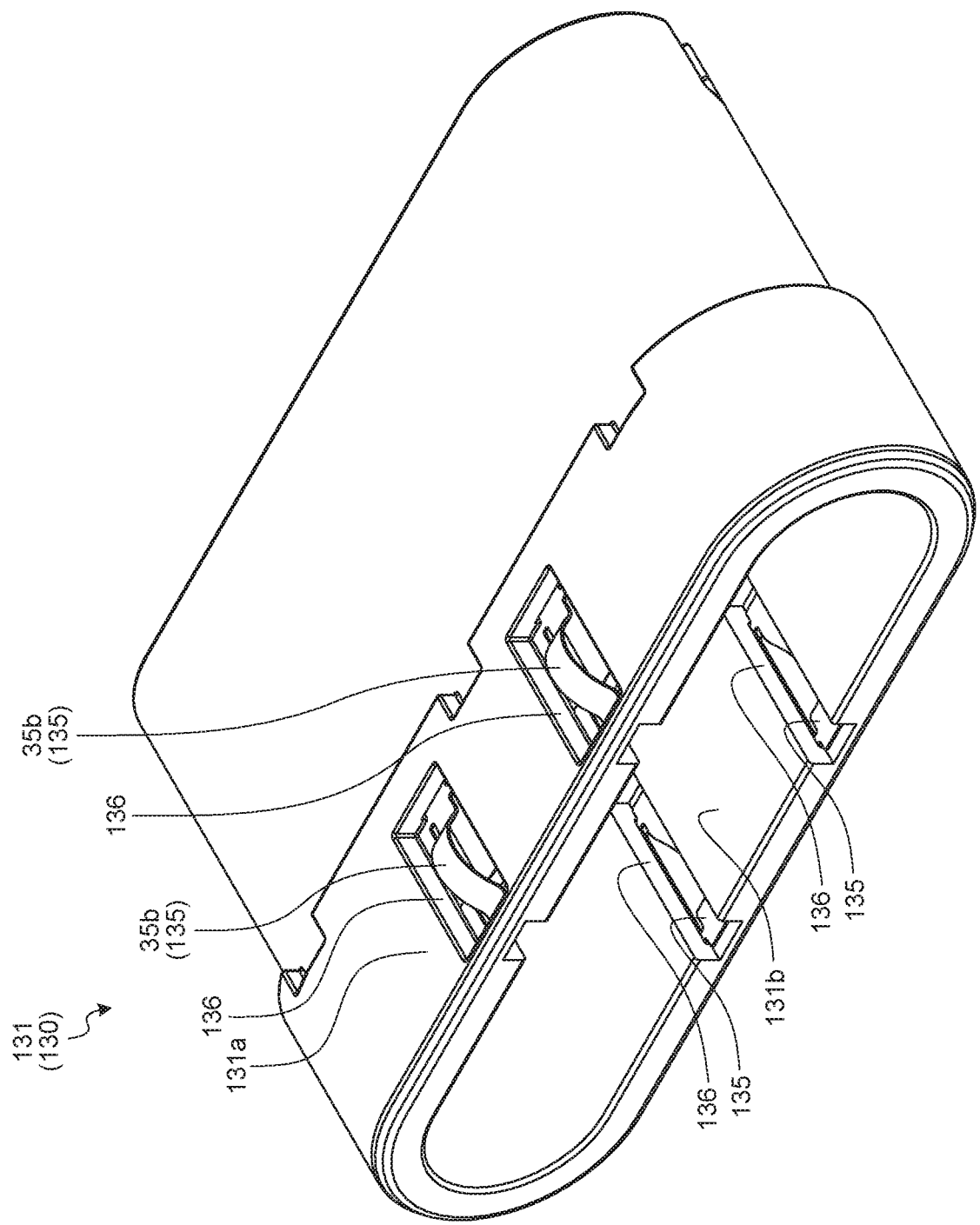
FIG. 24 is a perspective view illustrating an inner shell according to the modification to which electric contacts are assembled.
Figure 25:
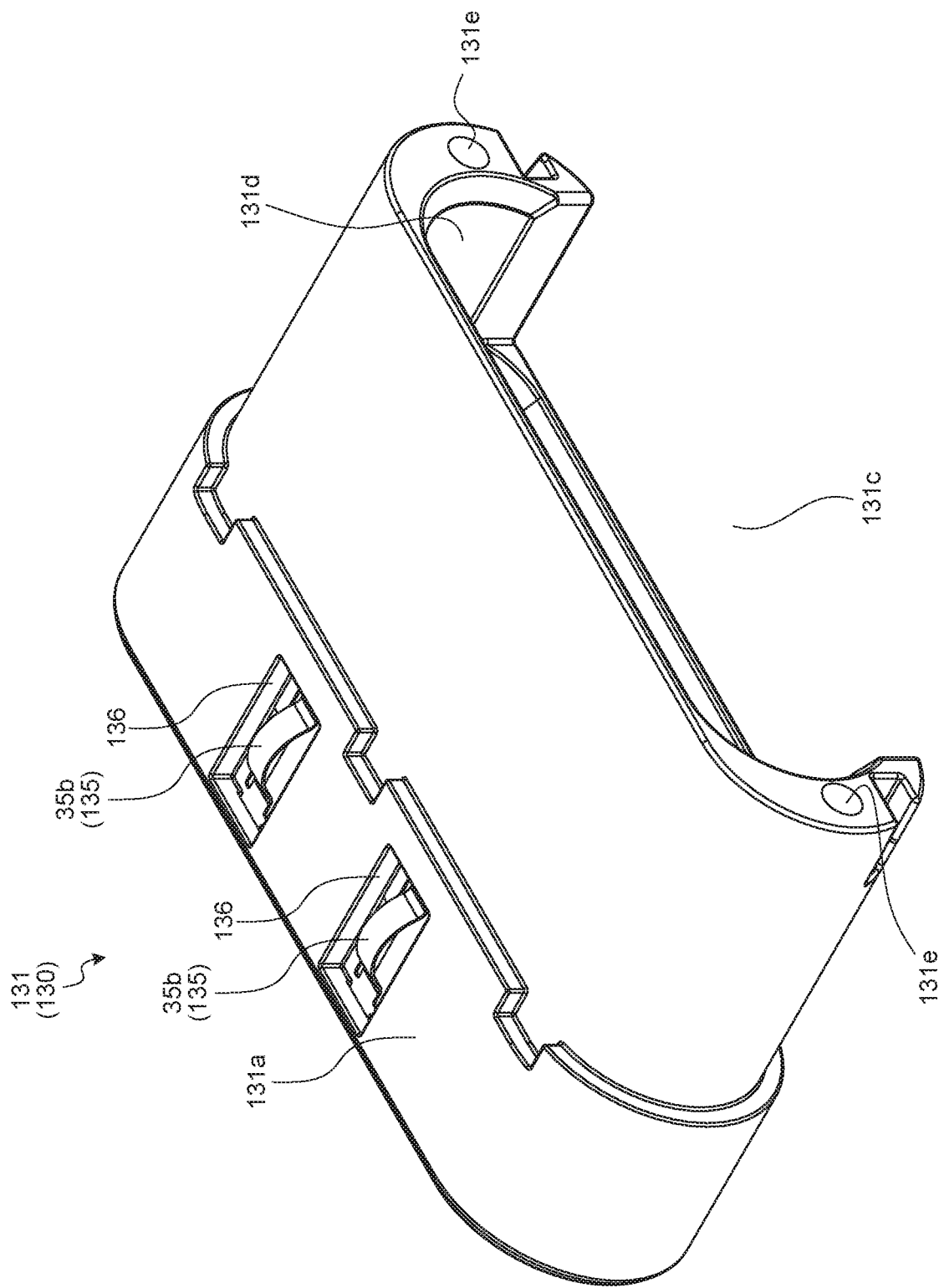
FIG. 25 is a perspective view of an inner shell according to the modification to which electric contacts are assembled as viewed from another angle.
Figure 26:
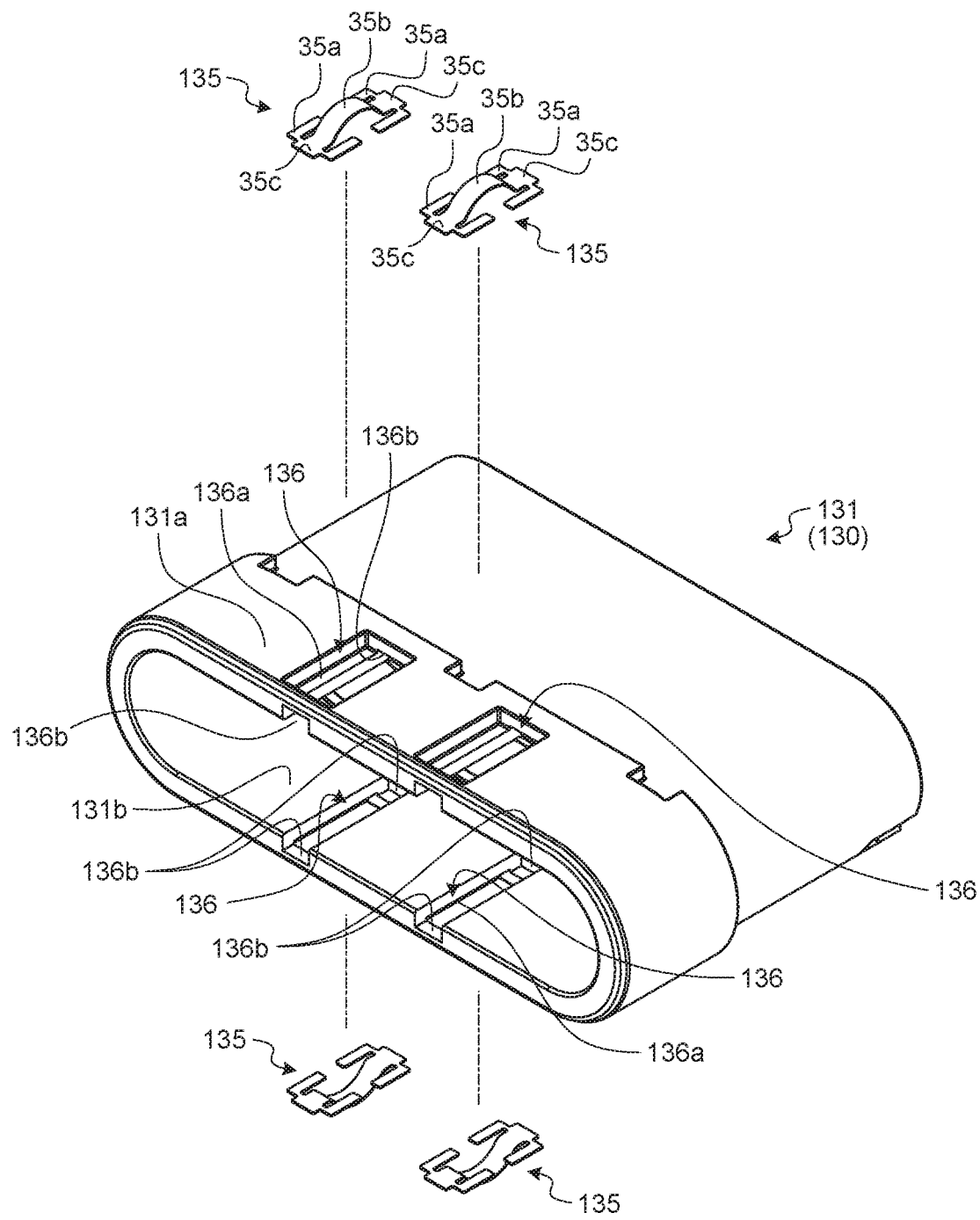
FIG. 26 is an exploded perspective view illustrating an inner shell and electric contacts according to the modification.

The inner shell 131 is formed in an oblong sleeve shape or an angular sleeve shape. In the exemplified example, the inner shell 131 is formed as an oblong sleeve body (FIGS. 24 to 26). A sleeve portion 121 of the inner housing 120 is housed in the inner shell 131. The respective terminal connecting portions 111 which protrude from the sleeve portion 121 of the inner shell 131 protrude from the opening at one end of the inner shell 131. The inner shell 131 has, in the same manner as the shield shell 30 of the embodiment, at one end side of the inner shell 131, two wall portions 131a and 131b which extend along the arrangement direction of the respective housing chambers 120a of the sleeve portion 121 housed in the inner shell 131 and are arranged so as to opposedly face each other in a spaced-apart manner (FIGS. 17, 18 and 24). The other end side of the inner shell 131 extends to the first opening 122a of the box portion 122. A notch 131c is formed on the other end side of the inner shell 131 so as to make a second opening 122b side of the box portion 122 protrude toward the outside (FIG. 25).

Figure 27:
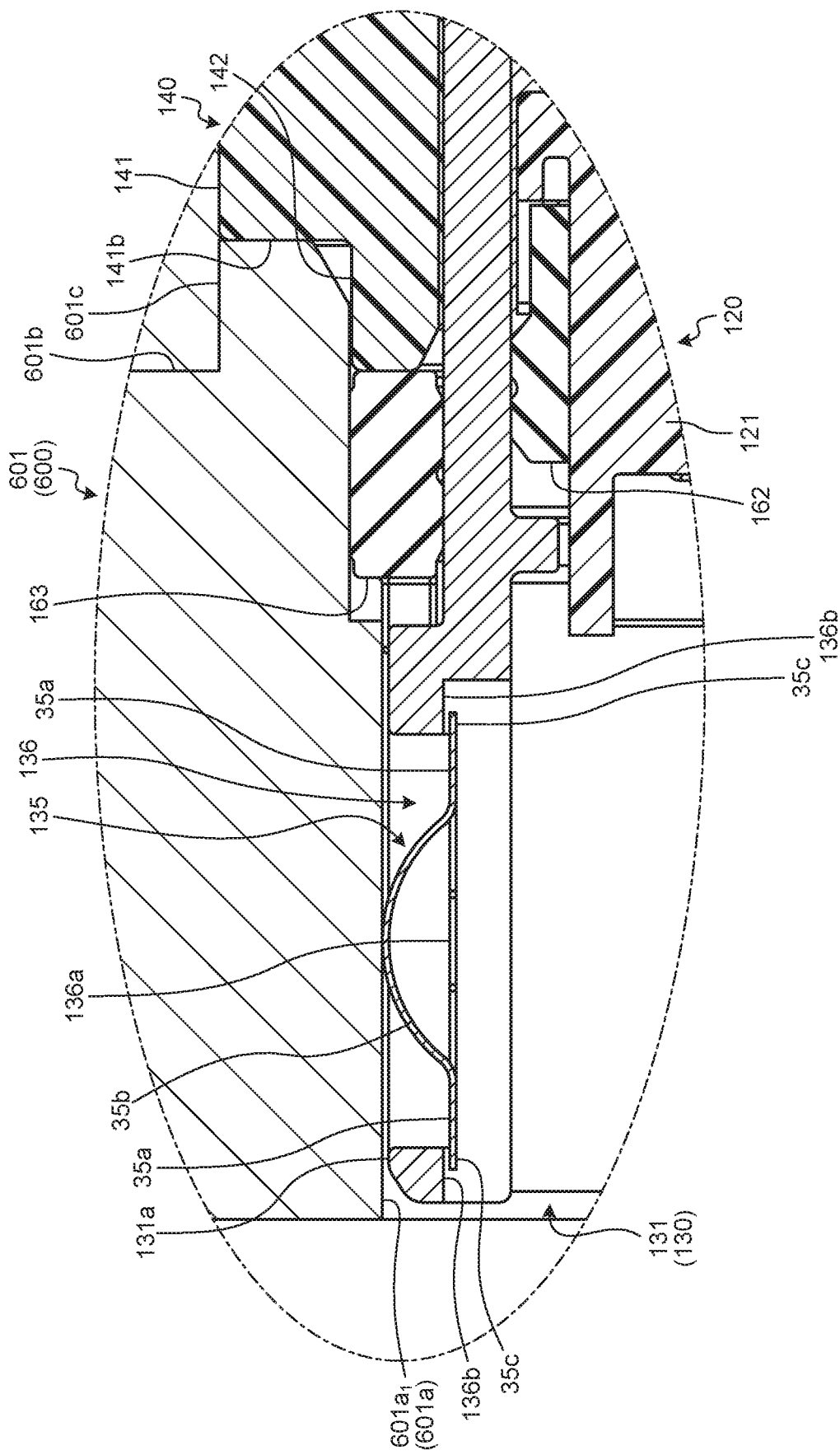
FIG. 27 is an enlarged view of a portion B illustrated in FIG. 17.
Figure 28:
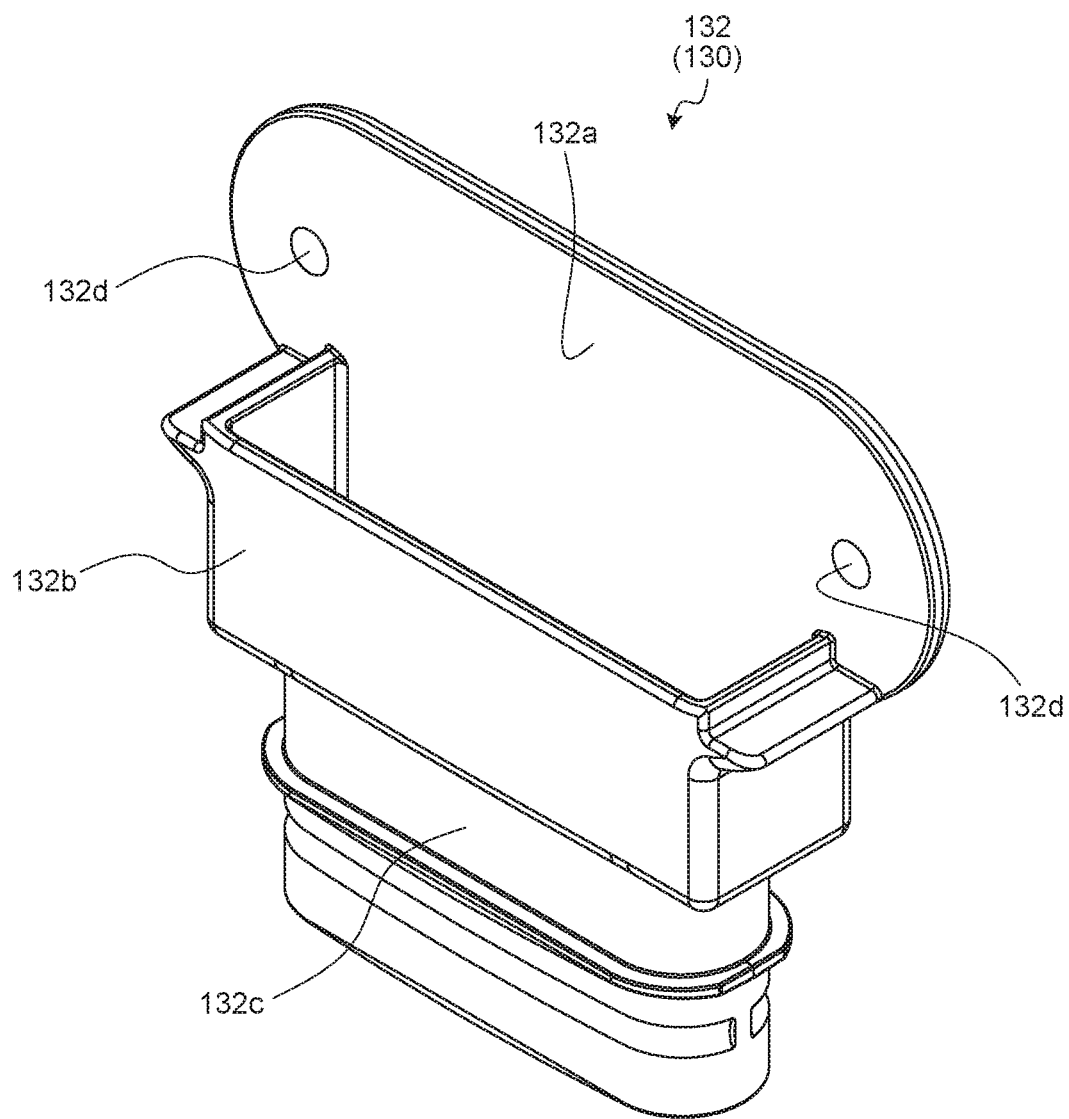
FIG. 28 is a perspective view illustrating an outer shell according to the modification.

This shield shell 130 has electric contacts 135 and contact assembling portions 136 which are substantially equal to the electric contacts 35 and the contact assembling portions 36 of the shield shell 30 of the embodiment (FIGS. 17 and FIGS. 24 to 27). The electric contacts 135 and the contact assembling portions 136 are formed on the inner shell 131. The electric contact 135 of this modification is equal to the electric contact 35 of the embodiment, and has two proximal portions 35a, an arcuate contact portions 35b, and two portions to be locked 35c. The contact assembling portion 136 of this modification is formed substantially equal to the contact assembling portion 36 of the embodiment. The contact assembling portion 136 has: two first locking portions 136a for locking the electric contact 135 so as to prevent the removal of the electric contact 135 in the inner shell 131; and two second locking portions 136*b* for locking the electric contact 135 for preventing removal of the electric contact 135 toward the outside of the inner shell 131 (FIGS. 26 and 27). Two contact assembling portions 136 are formed on each of two wall portions 131*a* and 131*b* of the outer peripheral wall of the inner shell 131. Arcuate top surfaces of the contact portions 35*b* of the electric contacts 135 protrude from the outer peripheral wall of the inner shell 131 in a state where the contact portions 35*b* are housed in the contact assembling portions 136, and the contact portions 35*b* are brought into contact with an inner peripheral wall 601*a*₁ of the insertion hole 601*a* of the housing 601 (FIGS. 17 and 27).

Also in the connector 2 of this modification, the electric contacts 35 may be formed as parts of the inner shell 131 as described in the description of the embodiment.

The connector 1 has an annular liquid invasion preventing member (hereinafter, referred to as "first liquid invasion preventing member") 162 which closes an annular gap between the outer peripheral wall of the inner housing 120 (the outer peripheral wall of the sleeve portion 121) and the inner peripheral wall of the inner shell 131 (FIGS. 17, 18, 21, and 27). The first liquid invasion preventing member 162 is a so-called packing having liquid invasion preventing property. The first liquid invasion preventing member 162 is configured such that the inner peripheral wall side is brought into close contact with the outer peripheral wall of the inner housing 120, and the outer peripheral wall side of the first liquid invasion preventing member 162 is brought into close contact with the inner peripheral wall of the inner shell 131. With such a configuration, an annular gap between the inner housing 120 and the inner shell 131 is filled by the first liquid invasion preventing member 162.

The outer shell 132 includes: a closing portion 132*a* having a flat plate shape which closes an opening 131*d* of the inner shell 131 on the other end (FIG. 25); a box portion 132*b* formed as a rectangular parallelepiped box body which houses the box portion 122 of the inner housing 120; and a sleeve portion 132*c* which houses the respective electrical wires We pulled out from the electrical wire pull-out opening of the inner housing 120, and from which the electrical wires We are pulled out to the outside (FIGS. 15 to 18 and 28).

The closing portion 132*a* is connected to one outer peripheral wall which forms the box portion 132*b* on the same plane, and closes the first opening 122*a* or the box portion 122 of the inner housing 120 together with the outer peripheral wall of the box portion 132*b*. The box portion 132*b* is formed in a shape which allows the box portion 132*b* to conceal a peripheral portion of the notch 131*c* of the inner shell 131. The sleeve portion 132*c* is formed in an oblong sleeve shape or an angular sleeve shape. In the exemplified example, the sleeve portion 132*c* is formed as an oblong sleeve body.

In the shield shell 130, the inner shell 131 and the outer shell 132 are fixed to each other by inserting a male threaded portion of the male threaded member B1 (FIGS. 15 to 19 and 21) into a through hole 132*d* of the closing portion 132*a* (FIG. 28), and by making the male threaded portion threadedly engage with a female threaded portion 131*e* (FIG. 25) of the inner shell 131.

In the connector 2, the respective electrical wires We pulled out from the sleeve portion 132*c* of the outer shell 132 toward the outside are covered by a braid 181 so as to suppress the further invasion of noise from the outside (FIGS. 15 to 21). The braid 181 is a member made of a metal material and intertwined in a sleeve shape and in a meshed shape. The braid 181 covers an outer peripheral wall of the sleeve portion 132*c* from the outside, and is brought into pressure contact with the outer peripheral wall of the sleeve portion 132*c* using a sleeve-shaped connection member 182 (FIGS. 15 to 21). Accordingly, in the connector 2, an electrical connection state between the shield shell 130 and the braid 181 is maintained.

The outer housing 140 is formed using an insulating resin material (insulating synthetic resin material or the like). The outer housing 140 covers the inner shell 131 of the shield shell 130 on a rear side in an advancing direction of the inner shell 131 at the time of inserting the inner shell 131 into the insertion hole 601*a* of the housing 601 together with the sleeve portion 121 of the inner housing 120 (hereinafter, simply referred to as "advancing direction") from the outside. The outer housing 140 has a sleeve portion 141 formed in an oblong sleeve shape or an angular sleeve shape (FIGS. 15, 17, 18 and FIGS. 20, 29 and 30). In the exemplified example, the sleeve portion 141 is formed in an oblong sleeve shape.

Figure 29:
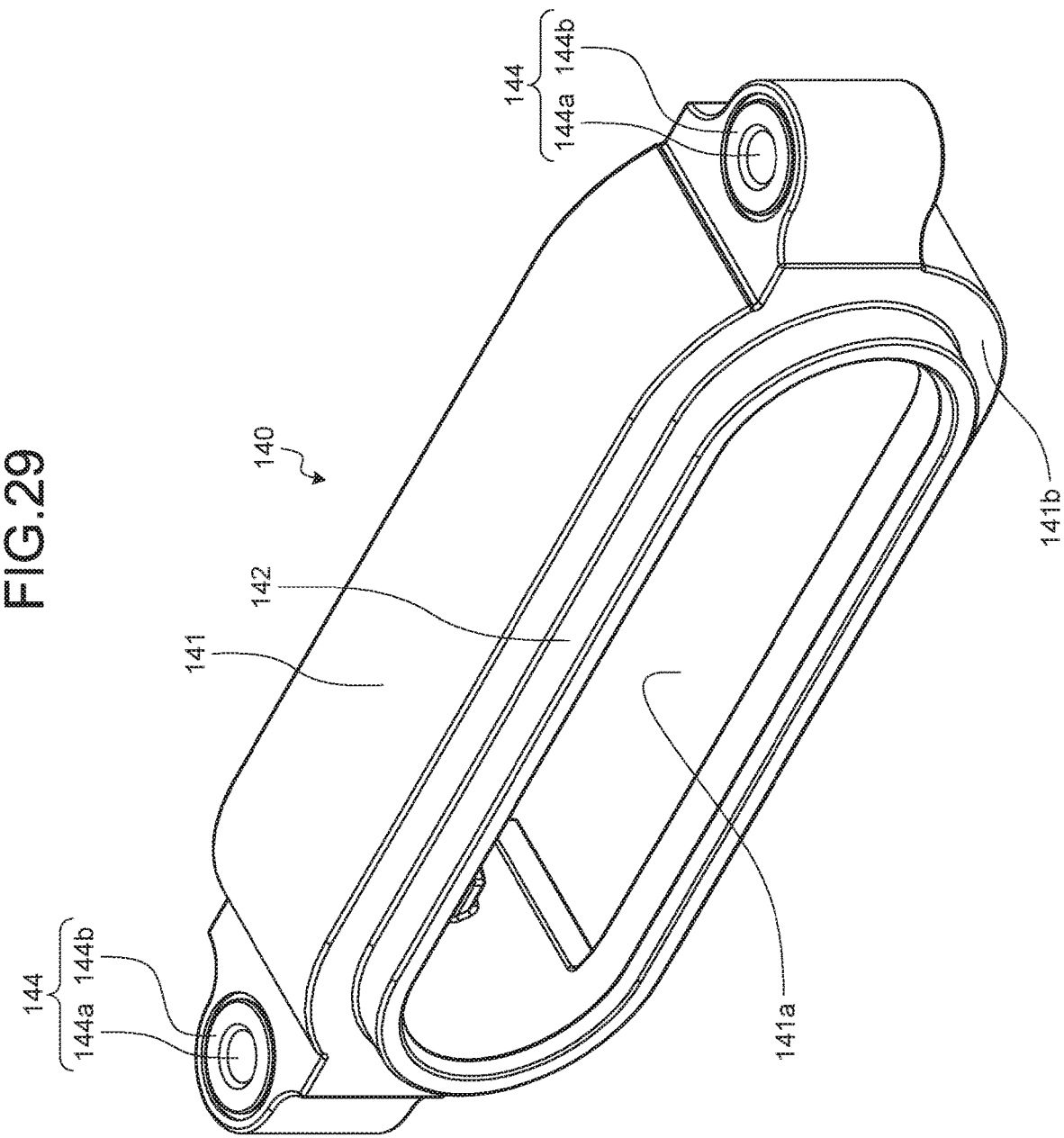
FIG. 29 is a perspective view illustrating an outer housing according to the modification.

A rear side of the inner shell 131 in an advancing direction, the sleeve portion 121 of the inner housing 120, and a sleeve portion 121 side of the box portion 122 of the inner housing 120 are housed in the sleeve portion 141. For this end, a notch 141*a* is formed on the sleeve portion 141 so as to make a second opening 122*b* side of the box portion 122 protrude toward the outside (FIGS. 29 and 30).

The opening 131*d* on the other end is formed on a rear side of the inner shell 131 in an advancing direction, and as described previously, the opening 131*d* is closed by the closing portion 132*a* by fixing the closing portion 132*a* of the outer shell 132 using bolts on the rear side of the inner shell 131 in the advancing direction. That is, the sleeve portion 141 of the outer housing 140 is disposed between a front side of the inner shell 131 in the advancing direction and the closing portion 132*a* of the outer shell 12. In other words, the outer shell 132 is physically and electrically connected to the inner shell 131 behind the outer housing 140 in the advancing direction.

The outer housing 140 has an annular fitting portion 142 which is disposed coaxially with the sleeve portion 141 and is fitted in the insertion hole 601*a* of the housing 601 (FIGS. 17, 18, 21, 29 and 30). The fitting portion 142 protrudes from an inner peripheral side on one end surface 141*b* having an annular shape of the sleeve portion 141 (FIGS. 17, 18, 21, and 29). On the other hand, in the exemplified example, the housing 601 has an annular portion 601*c* which protrudes from a first wall surface 601*b* around the insertion hole 601*a* formed in the first wall surface 601*b* (FIGS. 15, 17, 18, and 27). The fitting portion 142 is fitted in the annular portion 601*c*. That is, an outer peripheral wall of the fitting portion 142 engages with an inner peripheral wall of the annular portion 601*c* of the insertion hole 601*a* by fitting. With such a configuration, the fitting portion 142 suppresses the invasion of a liquid into the insertion hole 601*a* from the outside through between the outer peripheral wall and the inner peripheral wall.

Figure 19:
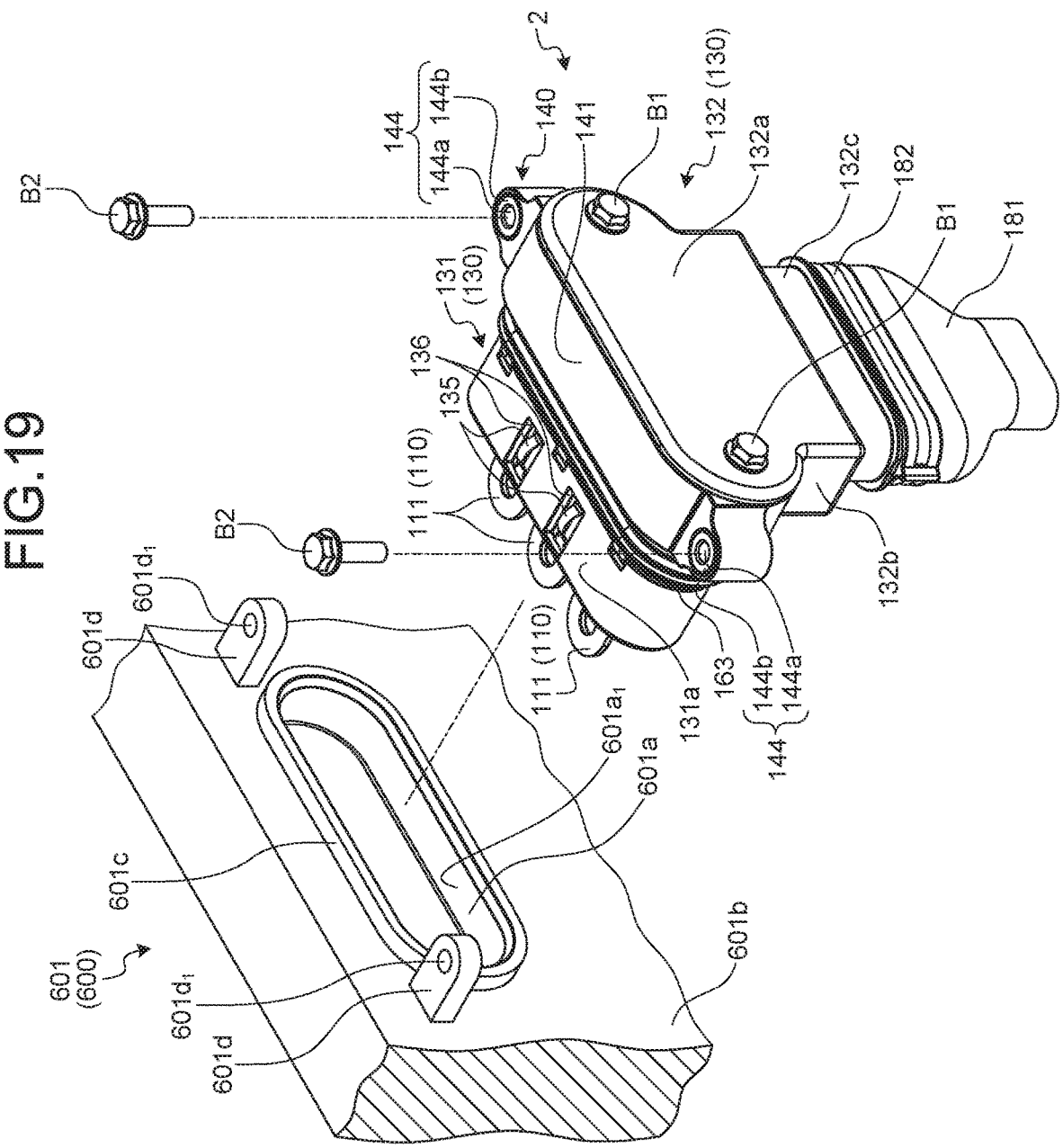
FIG. 19 is a perspective view illustrating a connector according to the modification before being mounted on a counterpart device.
Figure 20:
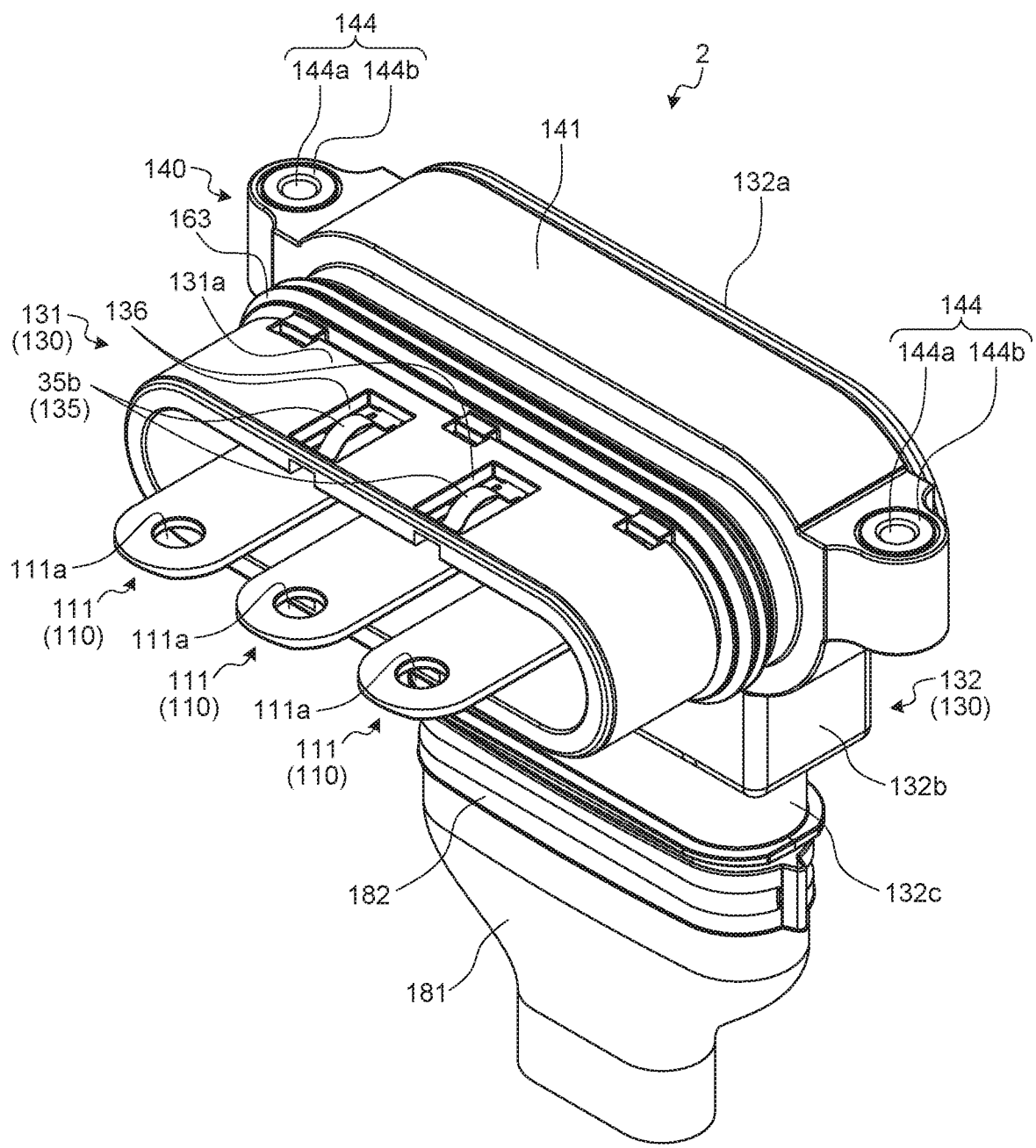
FIG. 20 is a perspective view of a connector according to the modification as viewed from a terminal side.

The outer housing 140 has fixing portions 144 for fixing the outer housing 140 to the housing 601 (FIGS. 15, 16, 19 to 21). For example, the housing 601 of this modification has portions to be fixed 601*d* which protrude from the first wall surface 601*b* in a hole axis direction of the insertion hole 601*a* (FIGS. 15, 16, and 19). The outer housing 140 is fixed to the housing 601 by mounting the fixing portion 144 on the portion to be fixed 601*d*. In the exemplified example, the combination of the fixing portion 144 and the portion to be fixed 601*d* which form a pair is disposed at two portions.

In the exemplified example, the fixing portion 144 is disposed at the position where the fixing portion 144 protrudes from the outer peripheral wall of the sleeve portion 141. The fixing portion 144 has: a groove portion 144a having a circular columnar shape; and a female threaded member 144b which is coaxially fitted in the groove portion 144a (FIGS. 19, 20, 29, and 30). The female threaded member 144b is formed in a circular columnar shape, and a female threaded portion is formed on an inner peripheral wall of the female threaded member 144b. On the other hand, in the exemplified example, the portion to be fixed 601d is formed in a cantilever manner. A through hole $601d_1$ which is disposed coaxially with the female threaded member 144b is formed in the portion to be fixed 601d (FIG. 19). One end of the female threaded member 144b in a sleeve axis direction protrudes from the groove portion 144a, and a circular annular end surface of such one end is brought into contact with a periphery of the through hole $601d_1$ formed in the portion to be fixed 601d. The fixing portion 144 is mounted on the portion to be fixed 601d in such a manner that the male threaded member B2 is threadedly engaged with the female threaded member 144b in a state where the portion to be fixed 601d is interposed and the male threaded member B2 (FIGS. 15 to 19) is inserted into the through hole $601d_1$.

In this embodiment, the female threaded member 144b is formed using a metal material, for example. Accordingly, it is desirable that the female threaded member 144b be formed using a metal material having the same or the substantially same ionization tendency as the housing 601 with which one circular annular end surface of the female threaded member 144b at one end is brought into contact. By adopting such configuration, in the connector 2, it is possible to suppress the occurrence of electrolytic corrosion between the female threaded member 144b and the housing 601. Also in the case where the male threaded member B2 is formed using a metal material, it is desirable that the male threaded member B2 be formed using a metal material having the same or the substantially same ionization tendency as the housing 601. By adopting such configuration, in the connector 2, it is possible to suppress the occurrence of electrolytic corrosion between the male threaded member B2 and the housing 601.

There may be also case where the female threaded member 144b is formed using a metal material having ionization tendency which largely differs from ionization tendency of a metal material of the housing 601. In this case, it is desirable to apply surface treatment to the female threaded member 144b using a material having the same or the substantially same ionization tendency as the housing 601. For example, in the case where the housing 601 is formed using aluminum, anodizing or tin plating may be applied to the surface of the female threaded member 144b. As surface treatment applied to the female threaded member 141b, insulating coating (for example, coating using an insulating synthetic resin material) may be applied to the surface of the female threaded member 144b. Also by adopting such surface treatment, in the connector 2, it is possible to suppress the occurrence of electrolytic corrosion between the female threaded member 144b and the housing 601. Also there may be a case where the male threaded member B2 is formed using a metal material having ionization tendency which largely differs from ionization tendency of a metal material of the housing 601. In this case, it is desirable to apply surface treatment to the male threaded member B2 using a material having the same or the substantially same ionization tendency as a material of the housing 601, or it is desirable to apply surface treatment to the male threaded member B2 using insulating coating. By adopting such configuration, in the connector 2, it is possible to suppress the occurrence of electrolytic corrosion between the male threaded member B2 and the housing 601.

The connector 2 includes an annular liquid invasion preventing member (hereinafter, referred to as a "second liquid invasion preventing member") 163 which closes an annular gap between the outer peripheral wall of the inner shell 131 of the shield shell 30 and the inner peripheral wall $601a_1$ of the insertion hole 601a of the housing 601 (FIGS. 17 to 21 and FIG. 27). The second liquid invasion preventing member 163 is a so-called packing having liquid invasion preventing property. An inner peripheral wall side of the second liquid invasion preventing member 163 is brought into close contact with the outer peripheral wall of the inner shell 131, and an outer peripheral wall side of the second liquid invasion preventing member 163 is brought into contact with the inner peripheral wall $601a_1$ of the insertion hole 601a of the housing 601. With such a configuration, an annular gap between the inner shell 131 and the insertion hole 601a of the housing 601 can be filled by the second liquid invasion preventing member 163.

Also in the connector 2, the electric contacts 135 are disposed in front of the first liquid invasion preventing member 162 and the second liquid invasion preventing member 163 in an advancing direction (FIG. 27). With such a configuration, in the connector 2, for example, even when a liquid such as water invades between the inner housing 120 and the inner shell 131 from the outside, the first liquid invasion preventing member 162 blocks the liquid. Accordingly, it is possible to suppress the invasion of the liquid into the electric contacts 135 through between the inner housing 120 and the inner shell 131. Further, in the connector 2, for example, even when a liquid such as water invades between the inner shell 131 and the insertion hole 601a of the housing 601 after flowing through between one annular end surface 141b of the sleeve portion 141 of the outer housing 140 and the annular end surface of the annular portion 601c of the housing 601, the second liquid invasion preventing member 163 blocks the liquid. Accordingly, it is possible to suppress the invasion of the liquid into the electric contacts 135 through between the inner shell 131 and the insertion hole 601a of the housing 601.

Further, in this connector 2, the fitting portion 142 of the outer housing 140 is fitted in the insertion hole 601a of the housing 601 behind the second liquid invasion preventing member 163 in the advancing direction (FIG. 27). In this connector 2, a creeping distance between the outer housing 140 and the housing 601 can be extended by the fitting portion 142. Accordingly, in this connector 2, even when a liquid such as water flows through between one annular end surface 141b of the sleeve portion 141 of the outer housing 140 and the annular end surface of the annular portion 601c of the housing 601, the liquid is guided to gap between the outer peripheral wall of the fitting portion 142 and the inner peripheral wall $601a_1$ of the insertion hole 601a. Accordingly, an amount of the liquid which reaches the second liquid invasion preventing member 163 can be reduced. Accordingly, in the connector 2, a liquid invasion preventing performance of the second liquid invasion preventing member 163 can be improved.

Further, in this connector 2, potting agent in a liquid form having insulating property is filled in the housing chambers 120a of the box portion 122 of the inner housing 120, and a liquid invasion preventing performance is increased by curing the potting agent. As the potting agent in a liquid form having insulating property, for example, thermosetting silicon or the like which is cured by applying heat is used. For example, in the connector 2, the terminal 110 and the rubber plug 161 which are assembled to the electrical wire We are housed in the housing chamber 120a of the inner housing 120 together with the electrical wire We, and a potting agent in a liquid form having insulating property is filled in the housing chamber 120a of the box portion 122 from the first opening 122a. The potting agent is filled to at least a position at which conductive parts (that is, the terminal 110 and the bare core wire We1 of the electrical wire We) in the housing chamber 120a of the box portion 122 are covered by the potting agent. In the connector 2, it is possible to suppress a liquid such as water from coming into contact with conductive parts in the housing chamber 120a of the box portion 122 by curing the potting agent in a liquid form and by surrounding the conductive parts with a cured material 190 (FIG. 18) of the potting agent. Further, in the connector 2, the opening of the housing chamber 120a of the sleeve portion 121 on a box portion 122 side is closed by the cured material 190. Accordingly, the inflow of a liquid into the housing chamber 120a of the sleeve portion 121 from the box portion 122 side can be suppressed. As a result, it is also possible to suppress a liquid from coming into contact with the terminal connecting portion 111 in the housing chamber 120a of the sleeve portion 121 and the counterpart terminal. As described above, in the connector 2, it is possible to maintain a conductive performance of the connector 2 by suppressing a liquid from coming into contact with the conductive parts in the housing chamber 120a by the cured material 190 of the potting agent.

In the connector 2 according to the modification described above, in the same manner as the connector 1 of the embodiment, the connector 2 is fixed to the housing 601 made of a metal material by way of the outer housing 140 made of an insulating resin material. Accordingly, in the connector 2, even when a liquid such as water invades between the outer housing 140 and the housing 601, electrolytic corrosion does not occur between the outer housing 140 and the housing 601 and hence, the durability of the outer housing 140 and the housing 601 can be improved.

In the connector 2 according to the modification, the outer housing 140 is fixed to the housing 601 by mounting the portion to be fixed 601d of the housing 601 on the fixing portion 144 of the outer housing 140 and by making the male threaded members B2 threadedly engage with the female threaded members 144b of the fixing portion 144. In this case, as described previously, in this connector 2, the female threaded members 144b and the male threaded members B2 are formed as members which can suppress the occurrence of electrolytic corrosion between the female threaded members 144b, the male threaded members B2 and the housing 601. Accordingly, in the connector 2, even when a liquid such as water invades between the female threaded members 141b, the male threaded members B2 and the portion to be fixed 601d of the housing 601, the occurrence of electrolytic corrosion between these members can be suppressed. As a result, durability of the female threaded members 144b, the male threaded members B2, and the housing 601 can be improved.

In the connector 2 of this modification, in the same manner as the connector 1 of the embodiment, the electric contacts 135 are disposed in front of the first liquid invasion preventing member 162 and the second liquid invasion preventing member 163 in an advancing direction and hence, as described previously, the invasion of a liquid to the electric contacts 135 can be suppressed. Accordingly, in the connector 2, the occurrence of electrolytic corrosion between the electric contacts 135 and the housing 601 can be suppressed and hence, durability of the electric contacts 135 and the housing 601 can be improved.

In the connector 2 of this modification, in the same manner as the connector 1 of the embodiment, the fitting portion 142 of the outer housing 140 is fitted in the insertion hole 601a of the housing 601 behind the second liquid invasion preventing member 163 in an advancing direction. Accordingly, as described previously, a liquid invasion preventing performance brought about by the second liquid invasion preventing member 163 can be improved. As a result, the connector 2 can further suppress the occurrence of electrolytic corrosion between the electric contacts 135 and the housing 601 and hence, durability of the electric contacts 135 and the housing 601 can be further improved.

In this manner, the connector 2 according to this modification can, in the same manner as the connector 1 of the embodiment, improve not only the durability of the connector 2 itself but also the durability of the counterpart device 600.

In the connector according to the present embodiment, the connector is fixed to the housing of the counterpart device made of the metal material by way of the outer housing made of an insulating resin material. With such a configuration of the connector, even when a liquid such as water intrudes between the outer housing and the housing, an electrolytic corrosion does not occur between the outer housing and the housing and hence, the durability of the outer housing and the durability of the housing can be improved. In this manner, the connector according to the present embodiment can improve not only the durability of the connector itself but also the durability of the counterpart device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A connector comprising:
a terminal physically and electrically connected to an end terminal of an electrical wire, the terminal being inserted into an insertion hole of a housing made of metal of a counterpart device, the terminal being physically and electrically connected to a counterpart terminal of the counterpart device;
an inner housing formed of an insulating resin material, the inner housing housing the terminal and the electrical wire, the inner housing allowing the electrical wire to be pulled out to an outside from the inner housing;
a shield shell formed of a metal material, the shield shell having a sleeve body that houses the inner housing in the sleeve body and is inserted into the insertion hole, and
an outer housing formed of an insulating resin material, the outer housing covering a rear side of the sleeve body in an advancing direction from an outside at the time of inserting the sleeve body into the insertion hole, wherein
the outer housing has a fixing portion that fixes the outer housing to the housing, and
the sleeve body has an electric contact that is brought into contact with an inner peripheral wall of the insertion hole.

2. The connector according to claim 1, further comprising:
- a first liquid invasion preventing member having an annular shape and configured to close an annular gap between an outer peripheral wall of the inner housing and an inner peripheral wall of the sleeve body; and
- a second liquid invasion preventing member having an annular shape and configured to close an annular gap between an outer peripheral wall of the sleeve body and the inner peripheral wall of the insertion hole of the housing, wherein the electric contact is disposed in front of the first liquid invasion preventing member and the second liquid invasion preventing member in the advancing direction.

3. The connector according to claim 2, wherein
the outer housing has a fitting portion having an annular shape that is disposed behind the second liquid invasion preventing member in the advancing direction and is fitted in the insertion hole.

4. The connector according to claim 3, wherein
the electric contact is an elastic contact configured to apply a reaction force generated by elastic deformation to the inner peripheral wall of the insertion hole from a sleeve body side.

5. The connector according to claim 4, wherein
the shield shell includes an inner shell that forms the sleeve body, and an outer shell that is disposed behind the outer housing in the advancing direction and is physically and electrically connected to the inner shell.

6. The connector according to claim 3, wherein
the shield shell includes an inner shell that forms the sleeve body, and an outer shell that is disposed behind the outer housing in the advancing direction and is physically and electrically connected to the inner shell.

7. The connector according to claim 3, wherein
the electric contact is an elastic contact part formed as a part separate from the sleeve body using a material having conductivity and elasticity, and configured to apply a reaction force generated by elastic deformation to the sleeve body and an inner peripheral wall of the insertion hole.

8. The connector according to claim 7, wherein
the shield shell includes an inner shell that forms the sleeve body, and an outer shell that is disposed behind the outer housing in the advancing direction and is physically and electrically connected to the inner shell.

9. The connector according to claim 2, wherein
the shield shell includes an inner shell that forms the sleeve body, and an outer shell that is disposed behind the outer housing in the advancing direction and is physically and electrically connected to the inner shell.

10. The connector according to claim 2, wherein
the electric contact is an elastic contact configured to apply a reaction force generated by elastic deformation to the inner peripheral wall of the insertion hole from a sleeve body side.

11. The connector according to claim 10, wherein
the shield shell includes an inner shell that forms the sleeve body, and an outer shell that is disposed behind the outer housing in the advancing direction and is physically and electrically connected to the inner shell.

12. The connector according to claim 2, wherein
the electric contact is an elastic contact part formed as a part separate from the sleeve body using a material having conductivity and elasticity, and configured to apply a reaction force generated by elastic deformation to the sleeve body and an inner peripheral wall of the insertion hole.

13. The connector according to claim 12, wherein
the shield shell includes an inner shell that forms the sleeve body, and an outer shell that is disposed behind the outer housing in the advancing direction and is physically and electrically connected to the inner shell.

14. The connector according to claim 1, wherein
the electric contact is an elastic contact configured to apply a reaction force generated by elastic deformation to the inner peripheral wall of the insertion hole from a sleeve body side.

15. The connector according to claim 14, wherein
the shield shell includes an inner shell that forms the sleeve body, and an outer shell that is disposed behind the outer housing in the advancing direction and is physically and electrically connected to the inner shell.

16. The connector according to claim 1, wherein
the electric contact is an elastic contact part formed as a part separate from the sleeve body using a material having conductivity and elasticity, and configured to apply a reaction force generated by elastic deformation to the sleeve body and an inner peripheral wall of the insertion hole.

17. The connector according to claim 16, wherein
the shield shell includes an inner shell that forms the sleeve body, and an outer shell that is disposed behind the outer housing in the advancing direction and is physically and electrically connected to the inner shell.

18. The connector according to claim 1, wherein
the shield shell includes an inner shell that forms the sleeve body, and an outer shell that is disposed behind the outer housing in the advancing direction and is physically and electrically connected to the inner shell.

* * * * *